(12) United States Patent
Hewavithana et al.

(10) Patent No.: US 11,973,618 B2
(45) Date of Patent: Apr. 30, 2024

(54) ALGORITHM AND ARCHITECTURE FOR CHANNEL ESTIMATION IN 5G NEW RADIO

(71) Applicant: Intel Corporation, Santa Clara, CA (US)

(72) Inventors: Thushara Hewavithana, Tempe (GB); Yuzhou Zhang, San Diego, CA (US); Xuebin Yang, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 213 days.

(21) Appl. No.: 17/353,838

(22) Filed: Jun. 22, 2021

(65) Prior Publication Data

US 2022/0052880 A1 Feb. 17, 2022

Related U.S. Application Data

(60) Provisional application No. 63/065,016, filed on Aug. 13, 2020.

(51) Int. Cl.
*H04L 25/02* (2006.01)
*H04W 56/00* (2009.01)
*H04W 72/0446* (2023.01)

(52) U.S. Cl.
CPC ...... *H04L 25/0204* (2013.01); *H04L 25/0232* (2013.01); *H04W 56/004* (2013.01); *H04W 72/0446* (2013.01)

(58) Field of Classification Search
CPC ........ H04B 1/16; H04B 7/005; H04B 7/0456; H04B 17/309; H04L 1/00; H04L 5/00; H04L 25/02; H04L 25/0224; H04L 25/0232; H04L 27/00; H04L 27/26; H04L 27/28; H04W 24/00; H04W 56/00; H04W 56/004; H04W 72/00; H04W 72/04; H04W 72/0446
USPC ........ 370/252, 344; 375/259, 260, 262, 267, 375/316, 350, 371
See application file for complete search history.

(56) References Cited

U.S. PATENT DOCUMENTS

| | | | |
|---|---|---|---|
| 2014/0204782 A1* | 7/2014 | Geirhofer | H04B 7/0619 370/252 |
| 2018/0316409 A1* | 11/2018 | Yoon | H04B 7/0888 |
| 2021/0176097 A1* | 6/2021 | Zheng | H04W 72/30 |
| 2022/0103321 A1* | 3/2022 | Huss | H04L 25/0232 |
| 2023/0231683 A1* | 7/2023 | Ali | H04L 5/0051 370/329 |

* cited by examiner

*Primary Examiner* — Shawkat M Ali
(74) *Attorney, Agent, or Firm* — VIERING, JENTSCHURA & PARTNER mbB

(57) ABSTRACT

This disclosure relates to apparatuses, systems, and methods for channel estimation, and in particular channel estimation for 5G New Radio systems. The channel estimation interpolates, prior to performing a de-spreading operation, a first combined channel estimation and a second combined channel estimation to provide from the first combined channel estimation one or more channel estimation values at indices associated with the second combined channel estimation and/or to provide from the second combined channel estimation one or more channel estimation values at indices associated with the first combined channel estimation.

20 Claims, 6 Drawing Sheets

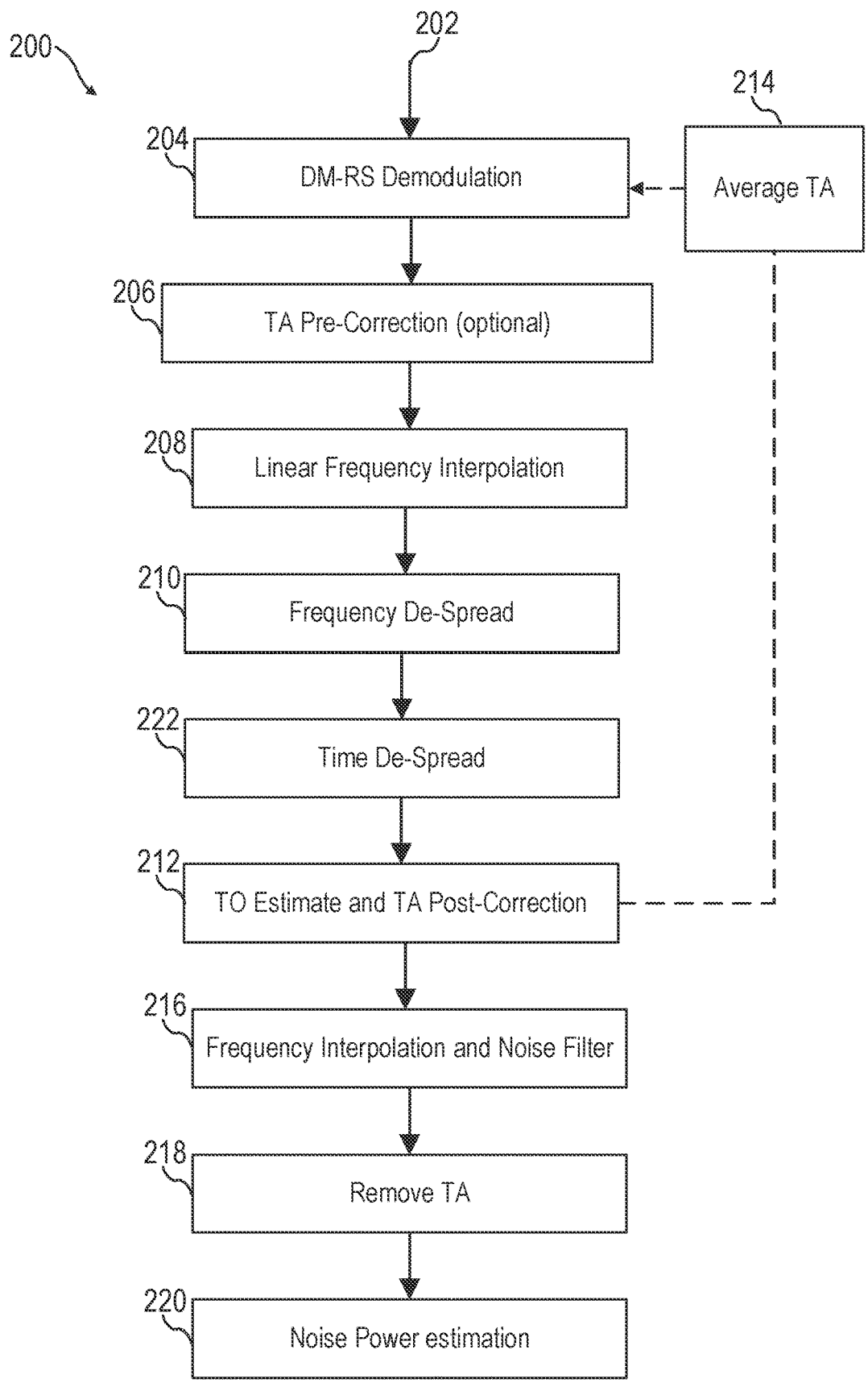

FIG. 3

310 — Receiving a reference symbol, the reference symbol having one or more first symbol values associated with a first antenna port and one or more second symbol values associated with a second antenna port

320 — Determining based on the received reference symbol a first channel estimation associated with the first antenna port

330 — Determining based on the received reference symbol a second channel estimation associated with the second antenna port

340 — Determining a first combined channel estimation associated with a first combination of the first channel estimation and the second channel estimation, wherein the first combined channel estimation has first combined channel estimation values, each associated with a subcarrier index for a first set of subcarrier indices

350 — Determining a second combined channel estimation associated with a second combination of the first channel estimation and the second channel estimation, second combined channel estimation has second combined channel estimation values, each associated with a subcarrier index for a second set of subcarrier indices

360 — Interpolating the first combined channel estimation to obtain first combined channel estimation values at subcarrier indices of the second set of subcarrier indices and/or interpolating the second combined channel estimation to obtain second combined channel estimation values at subcarrier indices of the first set of subcarrier indices

US 11,973,618 B2

ALGORITHM AND ARCHITECTURE FOR CHANNEL ESTIMATION IN 5G NEW RADIO

PRIORITY

This application claims priority to provisional U.S. patent application Ser. No. 63/065,016, filed Aug. 13, 2020, which is incorporated herein by reference in its entirety.

TECHNICAL FIELD

This disclosure generally relates to a channel estimation method and to an apparatus configured to carry out a channel estimation method.

BACKGROUND

Accurate estimation of channel response is a key ingredient in getting close to the optimal performance in any communication system. In fifth generation cellular network technology ("5G", also referred to as 5G New Radio ("NR")), in particular in 5G New Radio uplink ("UL"), dedicated orthogonal frequency division multiplexing ("OFDM") symbols of pilots called demodulation reference symbols ("DM-RS"), may be used to estimate the uplink channel.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 2A and FIG. 2B each depict a schematic flow diagram of an exemplary channel estimation method;

FIG. 3 depicts a schematic flow diagram of an exemplary channel estimation method.

DESCRIPTION

Figure 1A:
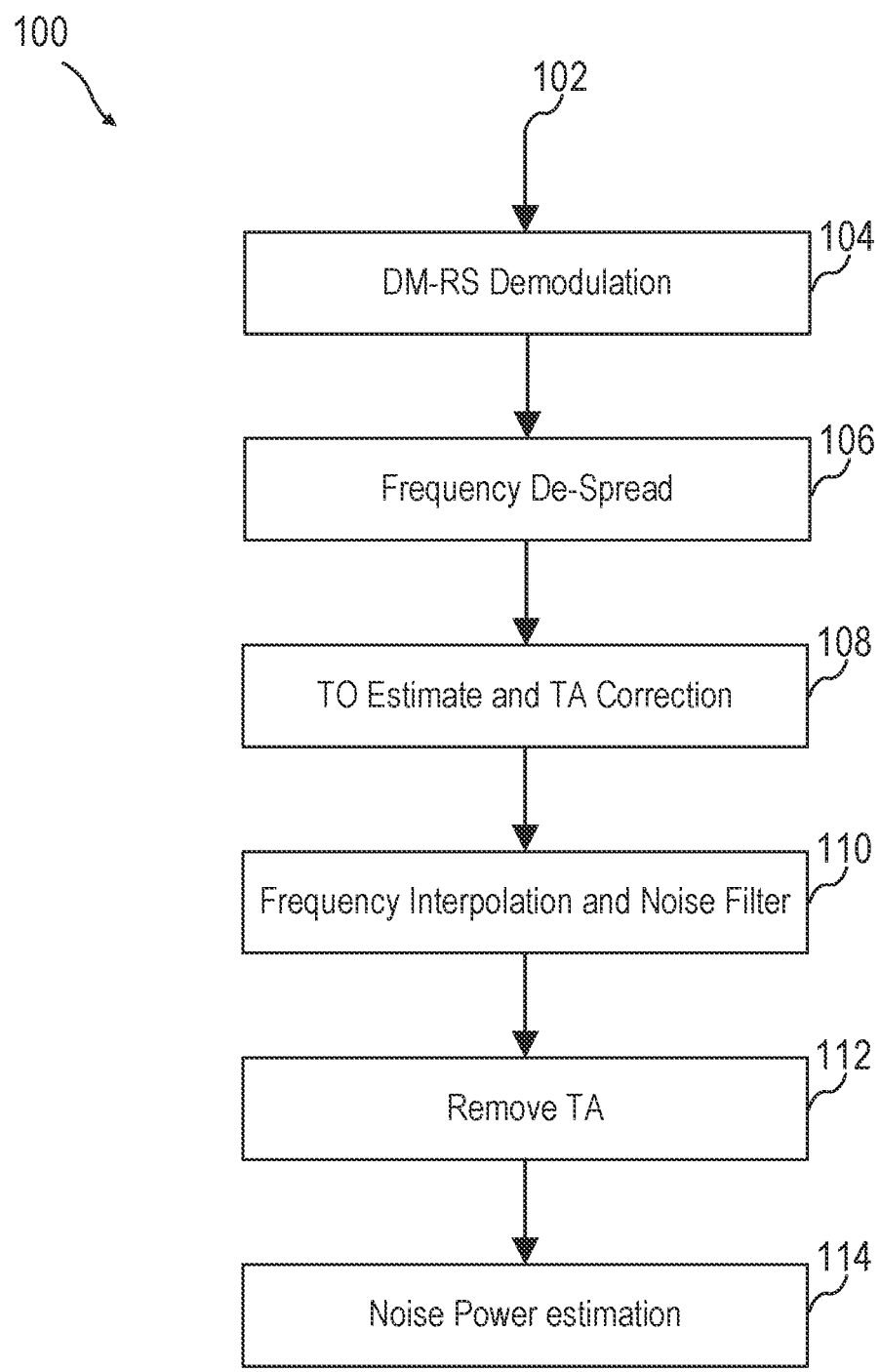
FIG. 1A depicts a schematic flow diagram of an exemplary channel estimation method.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

Any vector and/or matrix notation utilized herein is exemplary in nature and is employed solely for purposes of explanation. Accordingly, the apparatuses and methods of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer readable medium including instructions configured, when executed, to cause one or more processors to carry out the process (e.g., to carry out the method).

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("IMTS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.1 lad, IEEE 802.1 lay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations. The term "channel state information" is used herein to refer generally to the wireless channel for a wireless transmission between one or more transmitting antennas and one or more receiving antennas and may take into account any factors that affect a wireless transmission such as, but not limited to, path loss, interference, and/or blockage.

5G technology may be configured as a multiple-user multiple-input multiple-output ("MU-MIMO") system. Multiple transmit antenna ports (a transmit antenna port may also be referred to herein as "TX antenna port", as "TX port", or as "layer"), potentially from multiple user equipment ("UE"), may share the same DM-RS OFDM symbols to send pilots for uplink channel estimation. A user equipment may for example modulate its DM-RS pilots using a DM-RS sequence and a binary spreading code (illustratively, using a base sequence associated with the user equipment, e.g. a base sequence assigned to the user equipment). The DM-RS sequence used by the user equipment to modulate the DM-RS pilots may be known to the receiver, e.g. to a base station, and may be used for demodulating a DM-RS symbol provided (e.g., transmitted) by the user equipment. Illustratively, a base station may receive DM-RS pilots associated with multiple antenna ports from a single user equipment (e.g., associated with a plurality of antenna ports) or from a plurality of user equipment (e.g., each associated with respective one or more antenna ports).

An antenna port may be understood as a logical concept representing a specific channel or associated with a specific channel. An antenna port may be understood as a logical structure associated with a respective channel (e.g., a respective channel between a user equipment and a base station). Illustratively, symbols (e.g., OFDM symbols) transmitted over an antenna port (e.g., over a first channel) may be subject to different propagation conditions with respect to other symbols transmitted over another antenna port (e.g., over a second channel).

At a base station, by demodulating the pilots using the (known) DM-RS sequence and applying a de-spread code, the channel for each antenna port may be estimated, ideally with no interference from other antennas (e.g., with no interference from other antenna ports). At least this is what is intended in ideal additive white Gaussian noise ("AWGN") channel scenarios where the OFDM symbols are perfectly triggered to avoid any frequency selectivity in channel estimates, as explained in further detail below. If, for example, the timing of the OFDM trigger point is not ideal or there is multipath fading in the underlying communication channel, the channel response may be frequency selective. As a result, errors in channel estimation may result.

FIG. 1A illustrates a channel estimation method 100. The channel estimation method 100 may be a MU-MIMO UL channel estimation method, e.g. a MU-MIMO UL channel estimation algorithm based on DM-RS symbol signal processing.

The channel estimation method 100 may include, in 102, receiving a DM-RS symbol. The following example assumes a DM-RS Configuration Type 1 with TX port assignments of 0 and 1. This configuration type and TX port assignment are merely exemplary, and it should be understood that uplink channel estimation may done with other configuration types and other port assignments.

Figure 1B:
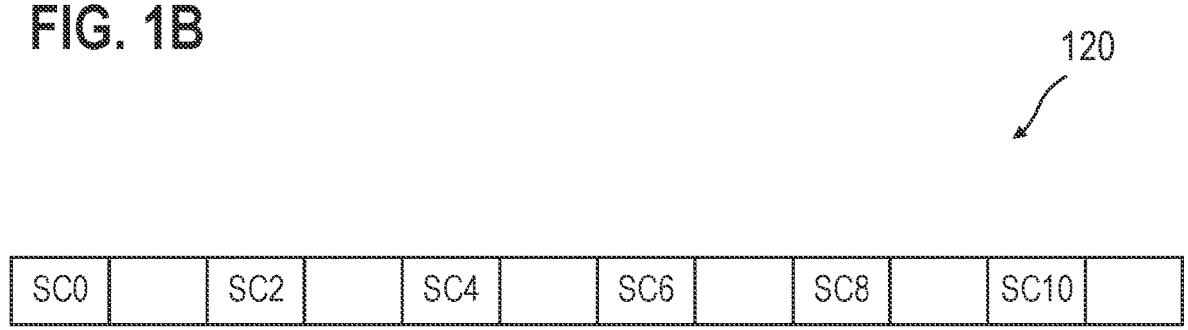
FIG. 1B and FIG. 1C each depict an exemplary configuration of a demodulation reference symbol.

A DM-RS configuration Type 1 is illustrated, for example, in FIG. 1B. In FIG. 1B a DM-RS symbol 120 is illustrated, configured according to a Type 1 configuration. The DM-RS symbol 120 may include, for example, symbol values at every even subcarrier index (SC0, SC2, . . . , SC10). It is understood that the DM-RS configuration illustrated in FIG. 1B (and later in FIG. 1C) is only an example, and the channel estimation process(es) described herein may be applied also to other DM-RS configurations (or, in general, to reference signals having other configurations). It is also understood that the number of subcarriers illustrated in FIG. 1B (and later in FIG. 1C) is only an example, and more or fewer subcarriers may be used or may be present in a symbol (e.g., in a reference symbol, e.g. in a DM-RS symbol).

Figure 1C:
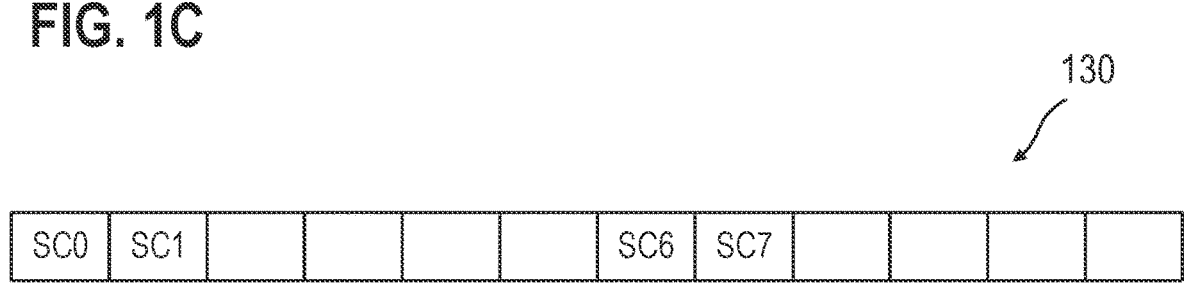

The subcarrier indices 0, 4, 8, . . . , may include values associated with a combined channel from TX port 0 and 1 as described in equation (1) below (e.g., the subcarrier indices 0, 4, 8, . . . , may carry combined channel from TX port 0 and 1 as described in equation (1) below). Illustratively, the subcarrier indices 0, 4, 8, . . . , may include values associated with a first combination of a first antenna port (e.g., TX port 0) with a second antenna port (e.g., TX port 1), e.g. a sum as described in equation (1) below. The subcarrier indices 2, 6, 10, . . . , may include values associated with a combined channel from TX port 0 and 1 as described in equation (2) below (e.g., the subcarrier indices 0, 4, 8, . . . , may carry combined channel from TX port 0 and 1 as described in equation (2) below). Illustratively, the subcarrier indices 2, 6, 10, . . . , may include values associated with a second combination of the first antenna port (e.g., TX port 0) with the second antenna port (e.g., TX port 1), e.g. a difference as described in equation (2) below A DM-RS configuration Type 2 is illustrated, for example, in FIG. 1C. In FIG. 1C a DM-RS symbol 130 is illustrated, configured according to a Type 2 configuration. The DM-RS symbol 130 may include, for example, symbol values arranged in pairs with a spacing of four subcarriers between consecutive pairs (e.g., SC0, SC1, . . . , SC6, SC7, . . . ). The subcarrier indices 0, 6, . . . , may include values associated with a combined sum channel from TX port 0 and 1 as described in equation (23) below (e.g., a channel associated with a sum of a channel estimation associated with the first antenna port and a channel estimation associated with the second antenna port). Illustratively, the subcarrier indices 0, 6, . . . , may include values associated with a first combination of a first antenna port (e.g., TX port 0) with a second antenna port (e.g., TX port 1), e.g. a sum as described in equation (23) below. The subcarrier indices 1, 7, . . . , may include values associated with a combined difference channel from TX port 0 and 1 as described in equation (24) below (e.g., a channel associated with a difference between a channel estimation associated with the first antenna port and a channel estimation associated with the second antenna port). Illustratively, the subcarrier indices 1, 7, . . . , may include values associated with a second combination of a first antenna port (e.g., TX port 0) with a second antenna port (e.g., TX port 1), e.g. a difference as described in equation (24) below. A DM-RS symbol having configuration Type 2 is also referred to herein as DM-RS type 2.

Pilot subcarriers received at DM-RS symbol corresponding to TX ports 0 and 1 for a DM-RS type 1 may be given by equations (1) and (2), as $$Y_{RS}(k_0,l,r) = H_{RS}(k_0,l,r,t_0) X_{DMRS}(k_0,l) + H_{RS}(k_0,l,r,t_1) X_{DMRS}(k_0,l) + n(k_0,l,r) \quad (1)$$

$$Y_{RS}(k_2,l,r) = H_{RS}(k_2,l,r,t_0) X_{DMRS}(k_2,l) - H_{RS}(k_2,l,r,t_1) X_{DMRS}(k_2,l) + n(k_2,l,r) \quad (2)$$

where $Y_{RS}(k,l,r)$ is the subcarrier k for symbol l for RX antenna r, $X_{DMRS}(k,l)$ is the transmitted DM-RS base sequence on subcarrier k and symbol l, $H_{RS}(k,l,r,t)$ refers to the channel frequency response for subcarrier k for symbol l for RX antenna r and TX port t ($H_{RS}(k,l,r,t)$ may also be referred to herein as channel matrix, channel response matrix, channel response, channel estimation, or channel estimate), and $n(k,l,r)$ is the noise in subcarrier k for symbol l for signal received at RX antenna r.

After receiving the pilot subcarriers for each TX port, channel estimation may be performed in two main parts. First, a noisy channel estimate (e.g., pre-noise filtering) may be obtained for each TX port at DM-RS pilot locations using DM-RS demodulation, frequency demodulation, obtaining a timing offset estimate and performing timing adjustment correction, depicted in modules 104, 106, and 108 of channel estimation method 100. Second, frequency response interpolation and noise filtering, removing the timing adjustment, and noise estimation may be performed to estimate the channel response for all subcarrier locations and filter out the noise in the channel response, as depicted in modules 110, 112, and 114. These modules are discussed in more detail below.

The channel estimation method 100 may include, in 104, a demodulation operation, e.g. DM-RS demodulation. The DM-RS demodulation module 104 may include decoding the (known) DM-RS sequence from the subcarriers (e.g., removing the DM-RS sequence from the (received) subcarriers), as indicated by equations (3) and (4) below, $$Y'_{RS}(k_0, l, r) = \quad (3)$$
$$\frac{Y_{RS}(k_0, l, r)}{X_{DMRS}(k_0, l)} = H_{RS}(k_0, l, r, t_0) + H_{RS}(k_0, l, r, t_1) + \frac{n(k_0, l, r)}{X_{DMRS}(k_0, l)}$$

$$Y'_{RS}(k_2, l, r) = \quad (4)$$
$$\frac{Y_{RS}(k_2, l, r)}{X_{DMRS}(k_2, l)} = H_{RS}(k_2, l, r, t_0) - H_{RS}(k_2, l, r, t_1) + \frac{n(k_2, l, r)}{X_{DMRS}(k_2, l)}$$

The channel estimation method 100 may include, in 106, a de-spread operation, e.g. a frequency de-spread. The channel estimation method 100 may include, in 106, a de-OCC (a de-"orthogonal cover code"). For channel estimation method 100, it may be assumed (e.g., in a conventional algorithm, e.g. in a conventional channel estimation method) that the channel response for subcarrier location $k_0$ and $k_2$ is the same (in other words, it may be assumed that the channel is frequency non-selective for adjacent DM-RS pilot locations), as indicated by the equations (5) and (6) below, $$H_{RS}(k_0,l,r,t_0) = H_{RS}(k_2,l,r,t_0) \quad (5)$$

$$H_{RS}(k_0,l,r,t_1) = H_{RS}(k_2,l,r,t_1) \quad (6)$$

Combining the equations (3) and (5), and ignoring the noise term, one may get the equations (7) and (8) below, $$H_{RS}(k_0, l, r, t_0) = H_{RS}(k_2, l, r, t_0) = \frac{1}{2}\left(\frac{Y_{RS}(k_0, l, r)}{X_{DMRS}(k_0, l)} + \frac{Y_{RS}(k_2, l, r)}{X_{DMRS}(k_2, l)}\right) \quad (7)$$

$$H_{RS}(k_0, l, r, t_1) = H_{RS}(k_2, l, r, t_1) = \frac{1}{2}\left(\frac{Y_{RS}(k_0, l, r)}{X_{DMRS}(k_0, l)} - \frac{Y_{RS}(k_2, l, r)}{X_{DMRS}(k_2, l)}\right) \quad (8)$$

In a conventional DM-RS demodulation and frequency de-spreading technique, there may be an inherent assumption that channel frequency response for adjacent DM-RS pilots remains the same to ensure near-perfect cancellation of interference from other antenna ports during channel estimation for a given TX antenna port. This may be related to the frequency de-spread being applied on two DM-RS pilots non-overlapping in frequency and assuming channel on these pilots to be the same (illustratively, frequency non-selective). In practice, this assumption may not always be true and DM-RS channel estimation may be corrupted by interference from other TX antenna ports. With practical mobile channels, channel response may be frequency selective due to, for example, non-ideal trigger point of OFDM and/or the multipaths in the underlying communication channel. Hence a conventional DM-RS channel estimation (e.g., as intended by 5G specification) may lead to some channel estimation errors.

The DM-RS Demodulation module 104 and the frequency de-spread module 106 (and the timing offset and timing adjustment correction module 108 described below) may be performed per TX port. Impulse response centering may also be performed per TX port, as described in further detail below. The DM-RS Demodulation module 104 and the frequency de-spread module 106 may produce channel frequency response estimation for each TX port at DM-RS pilot locations. This may be referred to as noisy channel estimation since no noise filtering has been done yet.

The channel estimation method 100 may include, in 108, timing offset (TO) estimation and timing adjustment (TA) correction (also referred to herein as timing offset estimate and timing adjustment correction). Following the DM-RS demodulation module 104 and the frequency de-spread module 106, the timing offset per each TX port may be estimated, for example using frequency domain techniques or time domain techniques. Methods (e.g., algorithms) for estimating timing offset per TX port are known in the art, and examples will be described in further detail below. Once the timing offset per TX port is estimated, a phase slope may be applied to the channel frequency responses to center the underlying channel impulse response in preparation of a frequency interpolation, described in further detail below.

The timing offset (TO) estimation and timing adjustment (TA) correction module 108 may be used to find a time shift that may be applied to a channel estimation to minimize the phase difference between adjacent DM-RS pilots (e.g., the phase difference due to multipath channel).

Using a frequency domain technique to estimate the timing offset may include estimating the phase difference between adjacent DM-RS pilots and averaging over the bandwidth and over all RX antenna ports for a given TX port to calculate the phase shift for that TX port. After estimating the phase shift for each TX port, the estimation of the timing offset may further include converting the phase slope in the frequency domain to a time shift in the time domain to estimate the timing offset (also referred to herein as time offset).

Figure 1D:
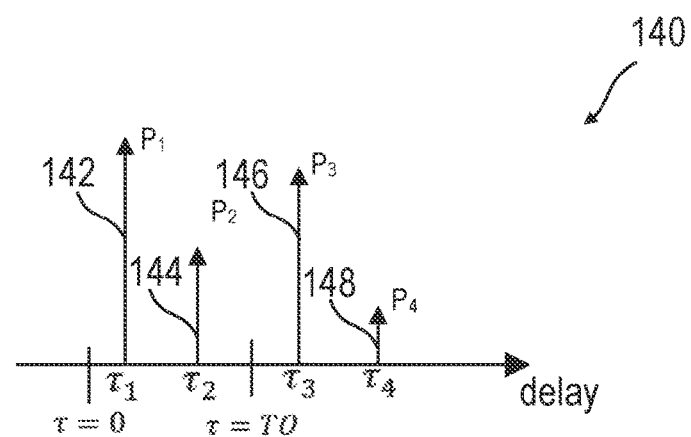
FIG. 1D depicts a graph related to determining an exemplary timing offset.

Using a time domain technique to estimate the timing offset may include using a discrete Fourier transform ("DFT") to convert a channel response for a given TX port to the time domain. Following the conversion into the time domain, the timing offset needed to center the impulse response may be estimated. The timing offset may be set to the time shift required to shift the channel impulse "center of gravity" (e.g., τ=T0 in FIG. 1D, e.g. determined as the average of the delays of the impulses that the channel impulse response includes) to a reference time (e.g., τ=0 in FIG. 1D), e.g. to time zero. This operation is illustrated in the graph 140 in FIG. 1D for an exemplary scenario of a TX port channel impulse response with 4 impulses with delay and power, $\{\tau_i, P_i\}$ for i=1, . . . 4, e.g. a first impulse 142 (with power $P_1$ and delay $\tau_1$), a second impulse 144 (with power $P_2$ and delay $\tau_2$), a third impulse 146 (with power $P_3$ and delay $\tau_3$), and a fourth impulse 148 (with power $P_4$ and delay $\tau_4$). Illustratively, with reference to FIG. 1D, the timing offset may be set to the time shift to be provided to shift the center of gravity (τ=T0) to the time zero (τ=0), e.g. in this exemplary configuration the timing offset to be applied may be T0 (with opposite sign with respect to the center of gravity).

The timing adjustment for a TX port (or user u), $TA_{est,u}$ (n), may be estimated as indicated by equation (9) below, $$TA_{est,u}(n) = \frac{\sum_i \tau_i P_i}{\sum_i P_i} \quad (9)$$

where n may refer to the slot number. A slot may be a 14 OFDM symbol frame structure in LTE and 5G. It is however understood that the definition of slot may vary, and a slot may be a frame structure including more or fewer than 14 OFDM symbols. A DM-RS symbol may take a predefined position in a slot. DM-RS may repeat in the same location in every slot.

The timing offset correction, $TA_{est,u}$(n), may be applied to the channel estimates described by equations (7) and (8) above, providing the equations (10) and (11) below, $$H_{RS}(k, l, r, t_0) = H_{RS}(k, l, r, t_0) \cdot e^{j \frac{2\pi k TA_{est,t_0}(n)}{N_{FFT}}} \quad (10)$$

-continued
$$H_{RS}(k, l, r, t_1) = H_{RS}(k, l, r, t_1) \cdot e^{j \frac{2\pi k TA_{est,t_1}(n)}{N_{FFT}}} \quad (11)$$

The channel estimation(s) provided by equations (10) and (11) may provide the input to the rest of the channel estimation method 100 (e.g., to frequency interpolation and noise filtering module 110). The operations carried out following the timing adjustment correction 108 (e.g., a frequency interpolation and noise filtering module 110, a removal of the timing adjustment module 112, and a noise power estimation module 114) may be based on known methods and will be described in further detail below.

The channel estimation method 100 may include, in 110, frequency interpolation and noise filtering. The frequency interpolation may both estimate the channel response for all subcarrier locations and filter out the noise in the channel response.

The channel estimation method 100 may include, in 112, removing the timing adjustment correction. Illustratively, following the frequency interpolation and noise filtering, the respective timing offset(s) may be removed from the channel estimation(s) to align the timing reference of the channel estimation(s) to original pilot data.

The channel estimation method 100 may include, in 114, noise power estimation. In the noise power estimation module 114 the pilots may be reconstructed with clean channel estimations and known pilot modulation before subtracting from noisy pilots to estimate the noise.

Channel estimation method 100, as described above in relation to FIG. 1A, may have a weakness emanating from the frequency non-selectivity assumption that led to equations (5) and (6). This assumption may be incorrect, for example, for propagation scenarios with long delay spread channels and/or for non-ideal OFDM trigger points, where channel estimations for adjacent DM-RS pilot locations may no longer be the same. This may be due to the fact that the timing offset has not yet been corrected when it comes to the frequency de-spreading operation (illustratively, the timing offset correction may be carried out after the frequency de-spreading). The frequency de-spreading operation may introduce errors into the channel estimation. Even if the timing offset correction is performed to minimize the phase error, the amplitude of the DM-RS pilot pair may not be the same for multipath channels.

A conventional DM-RS based channel estimation technique may assume a channel to be frequency non-selective between frequency de-spread subcarrier pairs. Any loss of performance may be taken as demodulator losses. This may limit the performance of a wireless system, especially for higher order Modulation and Coding Schemes ("MCS"), where the system is trying to receive higher order quadrature amplitude modulation ("QAM") with high forward error correction ("FEC") code rate requiring high modulation error rate ("MER") at the Demapper-Decoder input. In other words, channel estimation error may lead to a floor in modulation error rate, which may make it difficult to optimize the throughput of the communication channel.

A conventional DM-RS based channel estimation method may thus have poor SNR performance (e.g., inferior to the channel estimation method described in the following, for example in relation to FIG. 2A to FIG. 4, in almost all scenarios). This may also mean that there is very little headroom to support some of the more difficult delay Doppler scenarios, e.g. outside of 3GPP specification. The channel estimation method described in the following paragraphs, for example in relation to FIG. 2A to FIG. 4, may support use cases not previously possible.

A channel estimation method is discussed below that includes interpolation on demodulated DM-RS pilots so that the de-spread may be done over subcarriers with the same subcarrier index. The channel estimation method described in the following paragraphs, e.g. in relation to FIG. 2A, FIG. 2B, and FIG. 3, may be referred to herein as adapted channel estimation method.

The adapted channel estimation method may align, prior to carrying out a de-spread operation (e.g., prior to a de-OCC), subcarrier indices associated with channel estimations associated with different antenna ports. Illustratively, the adapted channel estimation method does not rely on an assumption that the estimated channel is frequency non-selective for adjacent DM-RS pilots.

The adapted channel estimation method may include determining (e.g., based on an interpolation) a channel estimation value for each subcarrier index associated with a channel estimation (instead of assuming a same channel estimation value for subcarriers having different indices). The channel estimation method (e.g., the algorithm) described herein may eliminate the need for assuming frequency non-selectivity of OFDM channel frequency response during DM-RS channel estimation. The adapted channel estimation method described herein may improve performance in practical channel scenarios.

The adapted channel estimation method described herein may provide improved wireless performance with very little complexity increase in an overall multi-user and massive MIMO 5G NR system.

The adapted channel estimation method may include channel interpolation performed in the composite channel domain (e.g., before frequency de-spread, illustratively before channels are separated into individual TX antenna ports). The frequency interpolation may provide aligning the pilot subcarrier indices before applying frequency de-spread. This may, for example, significantly reduce the corruption of a channel estimation for a given TX antenna from the signal from other TX antennas.

The adapted channel estimation method may include a timing adjustment phase before interpolation (illustratively, a pre-correction timing adjustment) to improve the accuracy of the interpolation (e.g., the accuracy of a simple linear frequency interpolator). The channel estimation method may include a timing adjustment pre-correction before the de-spread, e.g. before the frequency de-spread.

The adapted channel estimation method may include performing interpolation (e.g., linear interpolation) on demodulated DM-RS pilots so that the de-spread (e.g., the frequency de-spread) may be done over subcarriers with the same subcarrier index. This may eliminate channel estimation errors when channels exhibit frequency selectivity.

A channel estimation method (e.g., the channel estimation method 100, and/or the channel estimation method 200 and/or the channel estimation method 300) may be described herein with reference to DM-RS pilots and for an uplink channel. It is however understood that a channel estimation method may be applied also in scenarios in which other types of signals (or symbols) are used, e.g. other types of reference (signals or symbols). Illustratively, the channel estimation method may be applied in any scenario in which a reference signal (e.g., a frequency-domain pilot) is used for channel estimation, for example in combination with spreading (e.g., frequency spreading and/or time spreading). It is also understood that, for example, the channel estimation method may be applied for estimating a downlink ("DL") channel.

Figure 2A:
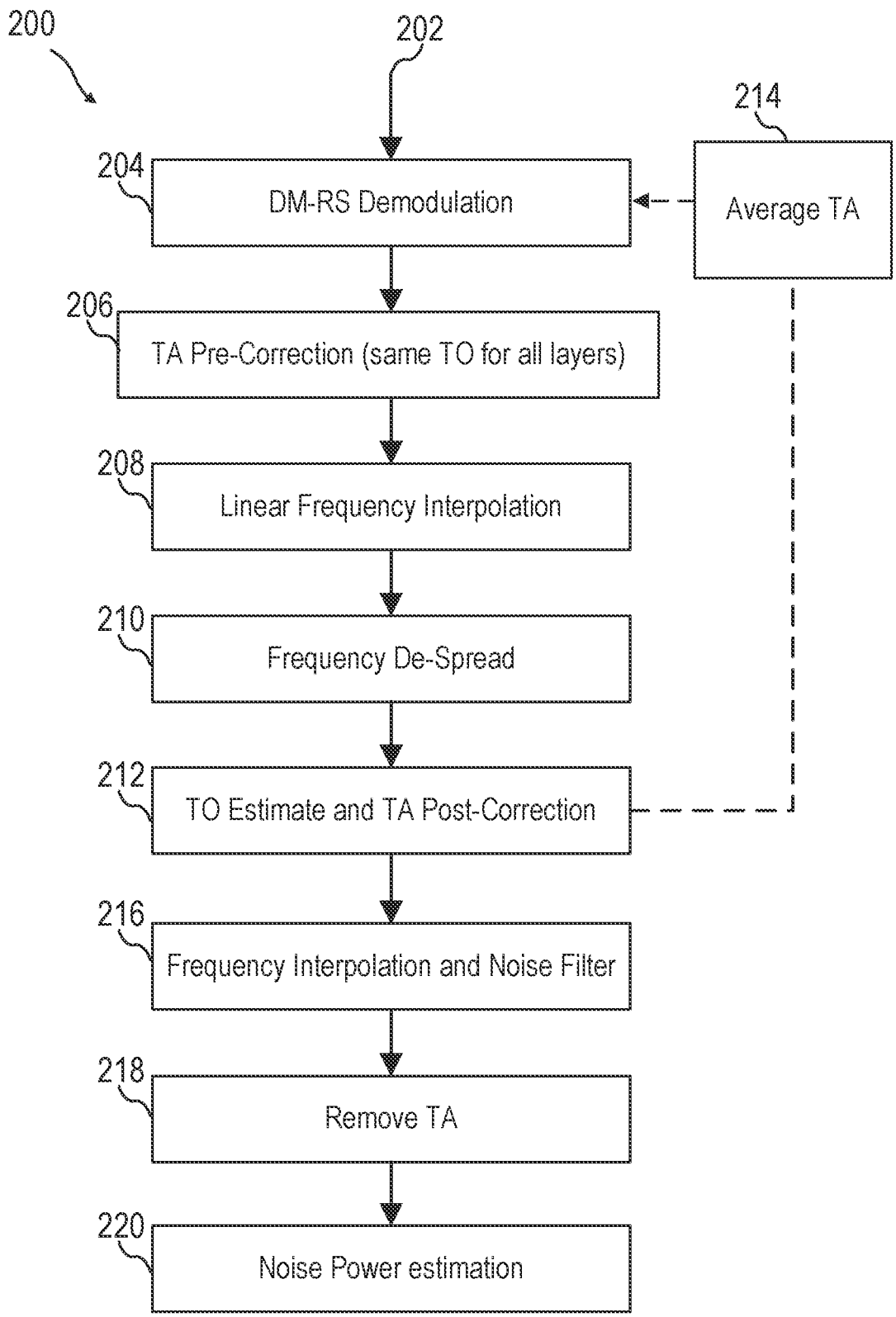

FIG. 2A and FIG. 2B each illustrate an exemplary channel estimation method 200. The channel estimation method 200 may be a MU-MIMO UL channel estimation method, e.g. a MU-MIMO UL channel estimation algorithm based on DM-RS symbol signal processing. The channel estimation method 200 may be configured as in the channel estimation method 100 described in relation to FIG. 1A. Illustratively, the channel estimation method 200 may be an adapted configuration of the channel estimation method 100.

The channel estimation method 200 may include, in 202, receiving a reference signal, e.g. a reference symbol (for example a DM-RS symbol), as described in relation to the channel estimation method 100 in relation to FIG. 1A. Without loss of generality, it is assumed for the following discussion a DM-RS configuration of Type 1, as described in relation to FIG. 1B. The channel estimation method 200 may be extended to a DM-RS configuration Type 2 (described, for example, in relation to FIG. 1C). It is also assumed, without loss of generality, a TX port (e.g., layer) assignment of 0 and 1. This configuration type and TX port assignment are merely exemplary, and it should be understood that uplink channel estimation may done with other configuration types and other port assignments. Illustratively, the channel estimation method 200 may include receiving (e.g., at one or more antennas) a plurality of subcarriers representing the reference signal. The received DM-RS symbol corresponding to TX ports 0 and 1 may be given by equations (1) and (2) described above.

The channel estimation method 200 may include, in 204, demodulating the received reference signal, e.g. the channel estimation method 200 may include DM-RS demodulation, e.g. as described in relation to DM-RS demodulation module 104 for the channel estimation method 100 in relation to FIG. 1A. The DM-RS demodulation module 204 may include, for example, removing the (known) DM-RS sequence from the subcarriers, as indicated by equations (3) and (4) described above and reproduced here below, $$Y'_{RS}(k_0, l, r) = \quad (3)$$
$$\frac{Y_{RS}(k_0, l, r)}{X_{DMRS}(k_0, l)} = H_{RS}(k_0, l, r, t_0) + H_{RS}(k_0, l, r, t_1) + \frac{n(k_0, l, r)}{X_{DMRS}(k_0, l)}$$

$$Y'_{RS}(k_2, l, r) = \quad (4)$$
$$\frac{Y_{RS}(k_2, l, r)}{X_{DMRS}(k_2, l)} = H_{RS}(k_2, l, r, t_0) - H_{RS}(k_2, l, r, t_1) + \frac{n(k_2, l, r)}{X_{DMRS}(k_2, l)}$$

The right-hand side of equation (3), and (4) may be considered as the superposition of channel from the two antenna ports (layers) of interest, $t_0$ and $t_1$. Although the channels are not yet separated into layers, this does not prevent the processing of these channels as a composite channel. The impulse response of the superimposed channel may be the coherent sum of the impulse responses of the two channels. The timing adjustment correction and interpolation, described in further detail below, may be applied to these composite channels.

The channel estimation method 200 may include, in 206, a timing adjustment pre-correction. A common timing offset ("TO") adjustment may be applied (e.g., by a timing adjustment pre-correction module) to all symbol data at the output of the DM-RS demodulation (e.g., at the output of a DM-RS Demodulation module).

This operation may be referred to as TA pre-correction to distinguish from the TA correction described in relation to channel estimation method 100 in FIG. 1A (e.g., to the TA correction module 108), which will be described in further detail below as TA post-correction module 212 in the channel estimation method 200. The TA pre-correction (performed by, e.g., timing adjustment pre-correction module 206) may be different from the timing adjustment correction described above in module 108 of channel estimation method 100 because in module 108, timing adjustment correction may be performed per layer (e.g., after frequency de-spreading) whereas module 206 may perform timing adjustment pre-correction on an aggregate basis (e.g., before frequency de-spreading) using a common timing offset. The common timing offset may be the average of timing offset estimate for all layers. The timing adjustment pre-correction may be dispensed with, and only a timing adjustment post-correction may be provided.

The channel estimation method 200 may include, in 212, a timing adjustment post-correction (e.g., a timing offset estimate and timing adjustment post-correction module). The timing adjustment post-correction may be carried out per layer. Illustratively, following a de-spread operation (e.g., a frequency de-spread, described in further detail below), which may provide per layer channel estimations, a timing offset estimation per each layer may be performed. In view of the common pre-correction described in relation to the operation in module 206, the estimation in the timing offset estimation (e.g., in a timing offset module) may be the residual offset for each layer. Following the timing offset estimation, a timing adjustment post-correction may be carried out to apply the residual timing offset per layer.

The timing offset output specified per layer (e.g., from a post-correction module 212) into a frequency interpolator and noise filter module (e.g. to frequency interpolation and noise filter module 216), may include the sum of the pre- and post-timing offset corrections, as described by equation (12) below, $$TA'_{est,u}(n) = TA\_AVE(n) + TA_{est,u}(n) \quad (12)$$

where n refers to slot number and u refers to the layer index.

These per layer timing offsets, $TA'_{est,u}(n)$, may be used to remove the timing offset (e.g., in removing the timing adjustment module 218, which may be configured, for example, as the removing timing adjustment module 112 described in relation to FIG. 1A) after the frequency interpolation (e.g., after frequency interpolation and noise filter module 216, which may be configured, for example, as the frequency interpolation and noise filter module 110 described in relation to FIG. 1A), and before the noise estimation operation (e.g., before noise power estimation module 220, which may be configured, for example, as the noise power estimation module 114 described in relation to FIG. 1A).

These per layer timing offsets, $TA'_{est,u}(n)$, may be used in average timing adjustment module 214 (e.g., in Average TA module) by adding the current average timing offset $TA\_AVE(n)$ to the average timing adjustment mean($TA_{est,u}$) in order to form the new timing offset for the next slot, as described by equation (13) below, $$TA\_AVE(n+1) = TA\_AVE(n) + \text{mean}(TA_{est,u}) \quad (13)$$

For the very first slot, there may be no prior TA_AVE(1) to apply in the TA pre-correction phase. An option may be to initialize TA_AVE(1)=0 and use this as the timing offset estimate for first slot. Another option may be to perform another iteration, so after obtaining the timing estimate for the second slot, TA_AVE(2), using TA_AVE(2) as the timing offset estimate for the first slot. Because TA_AVE(1) may have a minimal impact to wireless performance, performing this additional iteration to may not be necessary. In other words, it may be possible to assume that the timing offset attributable to the first slot is zero. In this case, TA_AVE(1) may be simply set to a value of 0.

Interpolation (e.g., linear frequency interpolation) may be applied to timing offset adjusted data to align the subcarrier indices using the common timing offset correction before applying the de-spread (e.g., the frequency de-spread), as described in further detail below.

The common timing offset pre-correction (e.g., the average of the timing offset for all layers) (e.g., TA_AVE) may be applied to all DM-RS symbol data, $Y'_{RS}$, taking the correct subcarrier's indices into account, as described by equation (14) below, $$Y'_{RS,comp}(k, l, r) = Y'_{RS}(k, l, r) \cdot e^{j\frac{2\pi k TA\_AVE}{N_{FFT}}} \quad (14)$$

Taking the two sequences in equations (3) and (4) separately, and ignoring the noise term, this may provide the results indicated in equations (15) and (16) below, respectively, $$Y'_{RS,comp}(k_0, l, r) = (H_{RS}(k_0, l, r, t_0) + H_{RS}(k_0, l, r, t_1)) \cdot e^{j\frac{2\pi k_0 TA\_AVE}{N_{FFT}}} \quad (15)$$

$$Y'_{RS,comp}(k_2, l, r) = (H_{RS}(k_2, l, r, t_0) - H_{RS}(k_2, l, r, t_1)) \cdot e^{j\frac{2\pi k_2 TA\_AVE}{N_{FFT}}} \quad (16)$$

Applying the time offset pre-correction before interpolation may further improve the accuracy of interpolation by "centering" the impulse responses.

The channel estimation method 200 may include, in 208, an interpolation, e.g. a linear frequency interpolation. The interpolation may provide for aligning the DM-RS pilot subcarrier indices before the de-spreading, e.g. before the frequency de-spreading. The interpolation may be simply interpolation of the channel, without noise filtering. Noise filtering may be carried out during a subsequent frequency interpolation and noise filtering (per layer) module 216, further down in the processing chain.

The right-hand side of equations (15) and (16) may be considered, for example, as the superposition of the channel from the two antenna ports of interest, $t_0$ and $t_1$. The impulse response of the superimposed channel may be the coherent sum of the impulse responses of the two channels, as indicated in equations (17) and (18) below, $$(H_{RS}(k_0, l, r, t_0) + H_{RS}(k_0, l, r, t_1)) \cdot e^{j\frac{2\pi k_0 TA\_AVE}{N_{FFT}}} = H_{RS}(k_0, l, r, t_{0,+1}) \quad (17)$$

$$(H_{RS}(k_2, l, r, t_0) - H_{RS}(k_2, l, r, t_1)) \cdot e^{j\frac{2\pi k_2 TA\_AVE}{N_{FFT}}} = H_{RS}(k_2, l, r, t_{0,-1}) \quad (18)$$

where $t_{0,+1}$ indicates that this is the sum of channels for $t_0$ and $t_1$, and $t_{0,-1}$ indicates that this is the difference of channels for $t_0$ and $t_1$. The first equation (17) may provide $t_{0,+1}$ composite channel for subcarriers indices 0, 4, . . . , and the second equation (18) may provide $t_{0,-1}$ composite channel for subcarrier indices 2, 6, . . . , in case of a DM-RS configuration Type 1 (e.g., described in relation to FIG. 1).

The interpolation may be applied to this superimposed channel just as it would be applied for individual channels in view of the fact that both channels may be delay spread bounded well within what is required to avoid aliasing.

The equations (17) and (18) may be interpolated, e.g. by 1:2, to determine (e.g., to calculate) channel response values at $k_0, k_2, \ldots$, for both $t_{0,-1}$ and $t_{0,+1}$ composite channels, as indicated in equations (19) and (20), respectively, $$[H_{RS}(k_0,l,r,t_{0,+1}), H_{RS}(k_4,l,r,t_{0,+1}), \ldots]$$
$$\xrightarrow{\text{Interp1:2}}[H_{RS}(k_0,l,r,t_{0,+1}), H_{RS}(k_2,l,r,t_{0,+1}), \ldots] \quad (19)$$

$$[H_{RS}(k_2,l,r,t_{0,-1}), H_{RS}(k_6,l,r,t_{0,-1}), \ldots]$$
$$\xrightarrow{\text{Interp1:2}}[H_{RS}(k_0,l,r,t_{0,-1}), H_{RS}(k_2,l,r,t_{0,-1}), \ldots] \quad (20)$$

The interpolation may provide the subcarrier indices for the two equations (19) and (20) being perfectly aligned in preparation for the de-spread, e.g. for the frequency de-spread.

The channel estimation method 200 may include, in 210, a de-spread operation, e.g. a frequency de-spread, e.g. a de-OCC. Having aligned the subcarrier indices for $t_{0,-1}$ and $t_{0,+1}$ composite channels, the de-spreading may be done using the channel estimations with the same subcarrier indices. Considering the exemplary case of a DM-RS type 1, this may be expressed by the equations (21) and (22) below, $$H_{RS}(k_{2n}, l, r, t_0) = \frac{H_{RS}(k_{2n}, l, r, t_{0,+1}) + H_{RS}(k_{2n}, l, r, t_{0,-1})}{2} \quad (21)$$

$$H_{RS}(k_{2n}, l, r, t_1) = \frac{H_{RS}(k_{2n}, l, r, t_{0,+1}) - H_{RS}(k_{2n}, l, r, t_{0-1})}{2} \quad (22)$$

The channel estimation method 200 may include, in 212, a timing offset estimation and timing adjustment post-correction (also referred to herein as timing offset estimate and timing adjustment post-correction). This operation may be configured in a similar manner as the timing offset estimation and timing adjustment correction module 108 described in relation to the channel estimation method 100 in FIG. 1A. In the timing offset estimation and timing adjustment post-correction module 212, the individual $TA_{est,u}$ may be applied to individual layers, as described for example in equations (10) and (11). Following the applying of the individual $TA_{est,u}$ to the individual layers, the per layer time offset values, $TA'_{est,u}$, may be updated as shown, for example, in equation (12). The per layer time offset values may be used after frequency interpolation and noise filtering (e.g., after the frequency interpolation and noise filtering module 216) to realign the channel estimation timing to original timing. TA_AVE may be updated as described in equation (13). The updated TA_AVE may be used in the next slot for TA pre-correction.

The channel estimation method 200 may be applied as described to align subcarrier indices for $t_{0,-1}$ and $t_{0,+1}$ composite channels also in case of a DM-RS type 2 (described, for example, in relation to FIG. 1C). In case of a DM-RS type 2, the subcarrier indices 0, 6, 12, . . . may include values associated with a combined sum channel from TX port 0 and 1 as described in equation (23) below (e.g., may carry combined sum channel from TX port 0 and 1, as described in equation (23) below), e.g. with a channel associated with a sum of a channel estimation associated with the first antenna port and a channel estimation associated with the second antenna port. In case of a DM-RS type 2, the subcarrier indices 1, 7, 13, . . . may include values associated with a combined difference channel from TX port 0 and 1 as described in equation (24) below (e.g., may carry combined sum difference from TX port 0 and 1, as described in equation (24) below), e.g. with a channel associated with a difference between a channel estimation associated with the first antenna port and a channel estimation associated with the second antenna port).

$$Y_{RS}(k_0,l,r)=H_{RS}(k_0,l,r,t_0)X_{DMRS}(k_0,l)+H_{RS}(k_0,l,r,t_1)$$
$$X_{DMRS}(k_0,l)+n(k_0,l,r) \quad (23)$$

$$Y_{RS}(k_0,l,r)=H_{RS}(k_1,l,r,t_0)X_{DMRS}(k_1,l)-H_{RS}(k_1,l,r,t_1)$$
$$X_{DMRS}(k_1,l)+n(k_1,l,r) \quad (24)$$

In case of a DM-RS type 2, an appropriate phase of 1:6 interpolation may be applied (e.g., instead of 1:2 interpolation) to align the indices of combined channel estimated before de-OCC.

The channel estimation method 200 may be extended to what may be referred to as dual DM-RS. Dual DM-RS may refer to a pair of adjacent DM-RS symbols (e.g., in a same slot) used to support more than 4 TX antenna ports in case of DM-RS Type 1 and more than 6 TX antenna ports in the case of DM-RS Type 2. Illustratively, in Dual DM-RS channel estimation for more simultaneous TX ports may be supported by using two adjacent DM-RS symbols.

Time de-spread may be used to double the number of ports from the single DM-RS case. Time de-spread between the two DM-RS forming the dual DM-RS formation may be used to add additional TX ports. Table 6.4.1.1.3-1 and 6.4.1.1.3-2 in 3GPP TS 38.211 (e.g., V15.8.0 (2020-01)), describe parameters for the DM-RS sequences that may be used for 8 ports, and 12 ports for DM-RS Type 1 and 2 respectively.

The channel estimation method 200 may include, in 222, a time de-spread, as illustrated for example in FIG. 2B. The time de-spread module 222 may be carried out after the frequency de-spread (e.g., as in a conventional DM-RS algorithm). Illustratively, the time de-spread module may be activated only for dual DM-RS Prior to Time De-Spread, the channel estimation method 200 may be applied to the pair of DM-RS symbols up to the frequency de-spread module 210 to generate the input for time de-spread module 222. Following the time de-spread, the channel estimation method 200 may continue to carry out a timing offset estimation and timing adjustment post-correction (e.g., TO estimate and TA Post-Correction module 212, performed on a per layer basis).

FIG. 3 illustrates a schematic flow diagram of a channel estimation method 300. The channel estimation method 300 may be an adapted channel estimation method, e.g. the channel estimation method 300 may be configured as the channel estimation method 200 and vice versa. The channel estimation method 200 may be an implementation of the channel estimation method 300.

The channel estimation method 300 includes, in 310, receiving a reference symbol (e.g., a DM-RS symbol). The reference symbol has one or more first symbol values associated with a first antenna port (e.g., TX port 0) and one or more second symbol values associated with a second antenna port (e.g., TX port 1).

The channel estimation method 300 includes, in 320, determining based on the received reference symbol a first channel estimation associated with the first antenna port.

The channel estimation method 300 includes, in 330, determining based on the received reference symbol a second channel estimation associated with the second antenna port.

The channel estimation method 300 includes, in 340, determining a first combined channel estimation associated with a first combination of the first channel estimation and the second channel estimation (e.g., with one of a sum combined channel or a difference combined channel). The first combined channel estimation has first combined channel estimation values, each associated with a subcarrier index for a first set of subcarrier indices.

The channel estimation method 300 includes, in 350, determining a second combined channel estimation associated with a second combination of the first channel estimation and the second channel estimation (e.g., with the other one of a sum combined channel or a difference combined channel). The second combined channel estimation has second combined channel estimation values, each associated with a subcarrier index for a second set of subcarrier indices.

The channel estimation method 300 includes, in 360, interpolating the first combined channel estimation to obtain first combined channel estimation values at subcarrier indices of the second set of subcarrier indices and/or interpolating the second combined channel estimation to obtain second combined channel estimation values at subcarrier indices of the first set of subcarrier indices.

With reference to module 310, in addition to or in combination with any of the features discussed above with respect to channel estimation method 300, receiving the reference symbol may include receiving one or more subcarriers representing the reference symbol. In addition to or in combination with any of the features discussed in this paragraph, receiving the reference symbol may include receiving one or more subcarriers that have one or more first subcarrier values associated with the first antenna port and one or more second subcarrier values associated with the second antenna port.

With reference to module 320, in addition to or in combination with any of the features discussed above with respect to channel estimation method 300, the first combined channel estimation may be associated with one or more first subcarriers, and with reference to module 330, the second combined channel estimation may be associated with one or more second subcarriers. In addition to or in combination with any of the features discussed in this paragraph, the one or more first subcarriers may each be associated with a first subcarrier index and the one or more second subcarriers may each be associated with a second subcarrier index. In addition to or in combination with any of the features discussed in this paragraph, each first subcarrier index may be different from each second subcarrier index.

With reference to module 360, in addition to or in combination with any of the features discussed above with respect to channel estimation method 300, after interpolating, the first combined channel estimation may include a respective channel estimation value at each first subcarrier index and at each second subcarrier index. In addition to or in combination with any of the features discussed in this paragraph, the second combined channel estimation may include a respective channel estimation value at each first subcarrier index and at each second subcarrier index.

With reference to modules 340 and 350, in addition to or in combination with any of the features discussed above with respect to channel estimation method 300, the first combination of the first channel estimation and the second channel estimation may be calculated by adding the first channel estimation and the second channel estimation. In addition to or in combination with any of the features discussed in this paragraph, the second combination of the first channel estimation and the second channel estimation may be calculated by subtracting the second channel estimation from the first channel estimation.

With reference to modules 340 and 350, in addition to or in combination with any of the features discussed above with respect to channel estimation method 300, determining the first channel estimation and/or determining the second channel estimation may include demodulating the received reference symbol by using a known base sequence associated with the reference symbol. In addition to or in combination with any of the features discussed in this paragraph, demodulating the received reference symbol may include removing the known base sequence from one or more subcarriers representing the received reference symbol.

With reference to module 360, in addition to or in combination with any of the features discussed above with respect to channel estimation method 300, interpolating the first combined channel estimation and the second combined channel estimation may include aligning one or more first indices of one or more first subcarriers associated with the first combined channel estimation with one or more second indices of one or more second subcarriers associated with the second combined channel estimation. In addition to or in combination with any of the features discussed in this paragraph, each of the one or more first indices may be different from each of the one or more second indices.

With reference to module 310, in addition to or in combination with any of the features discussed above with respect to channel estimation method 300, the received reference symbol may include a demodulation reference symbol. In addition to or in combination with any of the features discussed in this paragraph, the demodulation reference symbol may be configured for operation in a fifth generation (5G) network. In addition to or in combination with any of the features discussed in this paragraph, the demodulation reference symbol may be configured according to a DM-RS Configuration Type 1 or DM-RS Configuration Type 2.

With reference to module 360, in addition to or in combination with any of the features discussed above with respect to channel estimation method 300, interpolating the first combined channel estimation and the second combined channel estimation may include 1:2 interpolation of the first combined channel estimation and the second combined channel estimation or it may include 1:6 interpolation of the first combined channel estimation and the second combined channel estimation. In addition to or in combination with any of the features discussed in this paragraph, interpolating may include linear frequency interpolation.

With reference to module 360, in addition to or in combination with any of the features discussed above with respect to channel estimation method 300, before interpolating, a common timing offset may be determined that is common to the first channel estimation and to the second channel estimation. In addition to or in combination with any of the features discussed in this paragraph, determining the common timing offset may include determining a first timing offset associated with the first antenna port and a second timing offset associated with the second antenna port. In addition to or in combination with any of the features discussed in this paragraph, the common timing offset may be determined by averaging the first timing offset and the second timing offset, wherein preferably the determined common timing offset is initialized to zero for a first slot. In addition to or in combination with any of the features discussed in this paragraph, the average common timing offset for the first slot may be updated to be the average common timing offset for a second slot of the plurality of time slots. In addition to or in combination with any of the features discussed in this paragraph, determining the common timing offset may include determining one or more first phase differences between adjacent symbol values of the one or more first symbol values and/or determining one or more second phase differences between adjacent symbol values of the one or more second symbol values.

In addition to or in combination with any of the features discussed in the prior paragraph, determining the common timing offset may include determining a first phase difference average that may be the average of the one or more first phase differences and/or determining a second phase difference average that may be the average of the one or more second phase differences. In addition to or in combination with any of the features discussed in this or the prior paragraph, determining the common timing offset may include determining a first time shift from the first phase difference average and/or determining a second time shift from the second phase difference average. In addition to or in combination with any of the features discussed in this or the prior paragraph, determining the common timing offset may include converting the first channel estimation to the time domain and/or converting the second channel estimation to the time domain. In addition to or in combination with any of the features discussed in this or the prior paragraph, converting to the time domain may include performing a discrete Fourier Transform.

In addition to or in combination with any of the features discussed in the prior two paragraphs, determining the common timing offset may include determining a first timing offset to center the first converted channel estimation around a reference time and/or determining a second timing offset to center the second converted channel estimation around the reference time. In addition to or in combination with any of the features discussed in this or the prior two paragraphs, the reference time may be a time zero. In addition to or in combination with any of the features discussed in this or the prior two paragraphs, the common timing offset may be applied to the first combined channel estimation to provide a first time adjusted channel estimation and/or the common timing offset may be applied to the second combined channel estimation to provide a second time adjusted channel estimation. In addition to or in combination with any of the features discussed in this or the prior two paragraphs, with reference to module 360, interpolating the first combined channel estimation and the second combined channel estimation may include interpolating the first time adjusted channel estimation and the second time adjusted channel estimation.

With reference to module 360, in addition to or in combination with any of the features discussed above with respect to channel estimation method 300, after interpolating, the first combined channel estimation may be combined with the second combined channel estimate. In addition to or in combination with any of the features discussed in this paragraph, module 360 may include combining the first combined channel estimations with the second combined channel estimation may comprise adding the first combined channel estimation to the second combined channel estimation and dividing the result of the addition by two to determine a channel estimation for the first antenna port. In addition to or in combination with any of the features discussed in this paragraph, combining the first combined channel estimation with the second combined channel estimation may include subtracting the second combined channel estimation from the first combined channel estimation and dividing the result of the subtraction by two to determine a channel estimation for the second antenna port.

With reference to module 360, in addition to or in combination with any of the features discussed above with respect to channel estimation method 300, after interpolating, module 360 may include de-spreading the first combined channel estimation with one or more orthogonal code sequences to determine a first de-spread channel response associated with the first antenna port and/or de-spreading the second combined channel estimation with one or more orthogonal code sequences to determine a second de-spread channel response associated with the second antenna port. In addition to or in combination with any of the features discussed in this paragraph, the one or more orthogonal code sequences may include one or more orthogonal cover code sequences. In addition to or in combination with any of the features discussed in this paragraph, the one or more orthogonal code sequences may comprise one or more orthogonal code sequences in the frequency domain. In addition to or in combination with any of the features discussed in this paragraph, module 360 may include de-spreading the first de-spread channel estimation with one or more orthogonal code sequences in the time domain and/or de-spreading the second de-spread channel estimation with one or more orthogonal code sequences in the time domain. In addition to or in combination with any of the features discussed in this paragraph, module 360 may include determining a first timing offset for the first de-spread channel estimation and a second timing offset for the second de-spread channel estimation. In addition to or in combination with any of the features discussed in this paragraph, the first timing offset may include a first residual timing offset with respect to a common timing offset that is common to the first channel estimation and to the second channel estimation and/or the second timing offset may include a second residual timing offset with respect to the common timing offset.

In addition to or in combination with any of the features discussed in the prior paragraph, module 360 may include adapting the common timing offset based on the first timing offset and on the second timing offset. In addition to or in combination with any of the features discussed in this or the prior paragraph, adapting the common timing offset may include adding an average of the first timing offset and the second timing offset to the common timing offset. In addition to or in combination with any of the features discussed in this or the prior paragraph, module 360 may include applying the determined first timing offset to the first de-spread channel estimation to provide a first time adjusted de-spread channel estimation and/or applying the determined second timing offset to the second de-spread channel estimation to provide a second time adjusted de-spread channel estimation. In addition to or in combination with any of the features discussed in this or the prior paragraph, module 360 may include performing a frequency interpolation and a noise filtering operation on the first time adjusted de-spread channel estimation to provide a first filtered channel estimation and/or performing a frequency interpolation and a noise filtering operation on the second time adjusted de-spread channel estimation to provide a second filtered channel estimation. In addition to or in combination with any of the features discussed in this or the prior paragraph, module 360 may include removing the first timing offset associated with the first de-spread channel estimation from the first filtered channel estimation to provide a first aligned channel estimation and/or removing the second timing offset associated with the second de-spread channel estimation from the second filtered channel estimation to provide a second aligned channel estimation. In addition to or in combination with any of the features discussed in this or the prior paragraph, module 360 may include estimating a first noise power associated with the first antenna port by using the first aligned channel estimation, and/or estimating a second noise power associated with the second antenna port by using the second aligned channel estimation.

With reference to module 310, in addition to or in combination with any of the features discussed above with respect to channel estimation method 300, the reference symbol may include a dual demodulation reference symbol. In addition to or in combination with any of the features discussed in this paragraph, the dual demodulation reference symbol may include adjacent symbols in a same slot.

With reference to modules 320 and 330, in addition to or in combination with any of the features discussed above with respect to channel estimation method 300, the first antenna port and/or the second antenna port may be associated with a channel that may be an uplink channel or a downlink channel.

With reference to modules 310, 320, 330, 340, and 360, the channel estimation method 300 may be stored in one or more non-transient computer readable media that is configured to cause one or more processors, when executed, to perform the channel estimation method 300, including, additionally or in combination with any, some, or all of the features discussed above with reference to modules 310, 320, 330, 340, and 360.

With reference to modules 310, 320, 330, 340, and 360, the channel estimation method 300 may be implemented in an apparatus, where the apparatus may be a base station and may be configured for operation in a fifth generation network, where the channel estimation method 300 may include, additionally or in combination with, any, some, or all of the features discussed above with reference to modules 310, 320, 330, 340, and 360.

Figure 4:
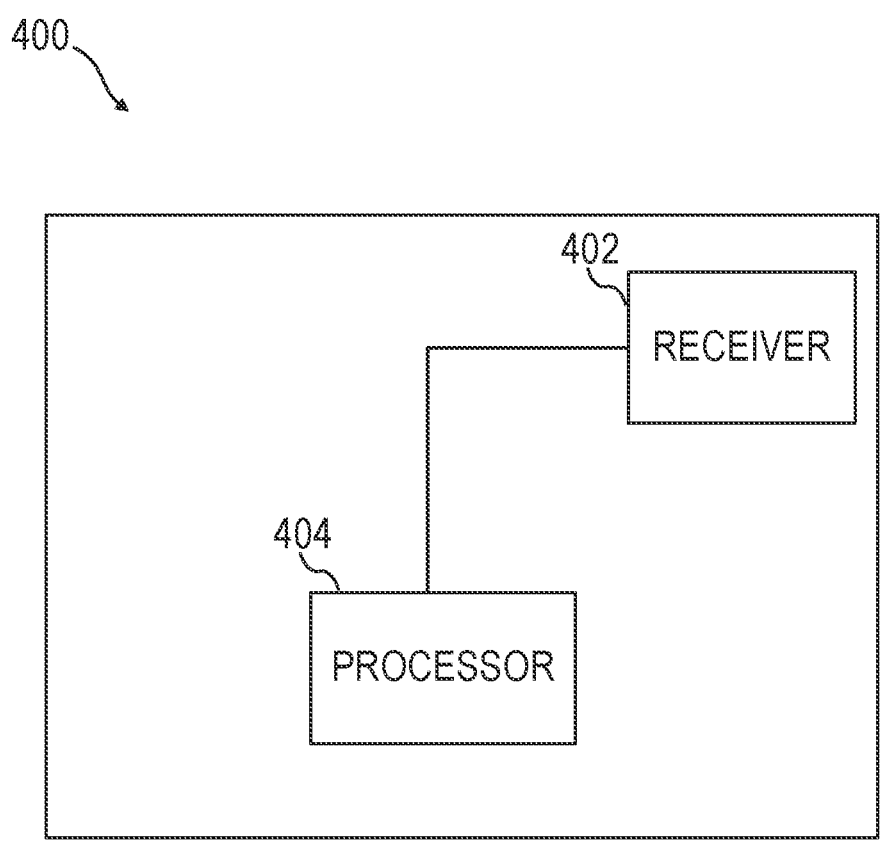
FIG. 4 depicts schematically an apparatus configured to carry out an exemplary channel estimation method.

FIG. 4 illustrates an apparatus 400 in an exemplary schematic representation. The apparatus 400 may be configured to carry out a channel estimation method, e.g. the channel estimation method 100, the channel estimation method 200, and/or the channel estimation method 300. The apparatus 400 may be an apparatus of a base station, for example configured for operation in a fifth generation network.

It is understood that the apparatus 400 is only an example, and other configurations may be possible, e.g. including different components or additional components.

The apparatus 400 includes a receiver 402 configured to receive a reference symbol (e.g., a DM-RS symbol). The reference symbol includes one or more first symbol values associated with a first antenna port (e.g., TX port 0) and one or more second symbol values associated with a second antenna port (e.g., TX port 1). The receiver 402 may include an antenna, e.g. a receiver antenna. The receiver 402 may include a plurality of antennas (e.g., a plurality of receiver antennas).

The apparatus 400 includes one or more processors 404 (e.g., processing circuitry). The one or more processors 404 are represented in FIG. 4 as a single element, it is however intended that the one or more processors 404 may be understood as one or more elements (or modules), that may also be separated from one other and may be configured to implement (e.g., in hardware circuitry and/or software) the various functions described herein in relation to the one or more processors 404. The one or more processors 404 are communicatively connected with the receiver 402. The one or more processors 404 are configured to receive the reference signal from the receiver 402 (e.g., after conversion into a signal that may be processed by the one or more processors 404, e.g. after conversion into a digital signal).

The one or more processors 404 are configured to determine based on the received reference symbol a first channel estimation associated with the first antenna port and to determine based on the received reference symbol a second channel estimation associated with the second antenna port. A channel estimator may carry out the channel estimation. Determining the first channel estimation and/or determining the second channel estimation may include demodulating the received reference symbol by using a known base sequence associated with the reference symbol (e.g., removing the known base sequence from one or more subcarriers representing the received reference symbol).

The one or more processors 404 are configured to determine a first combined channel estimation associated with a first combination of the first channel estimation and the second channel estimation (e.g., associated with a sum of the first channel estimation and the second channel estimation). The one or more processors 404 are configured to determine a second combined channel estimation associated with a second combination of the first channel estimation and the second channel estimation (e.g., associated with a difference between the first channel estimation and the second channel estimation). The first combined channel estimation includes channel estimation values, each associated with an index in a set of first indices. The second combined channel estimation includes channel estimation values, each associated with an index in a set of second indices.

The one or more processors 404 are configured to interpolate the first combined channel estimation to obtain channel estimation values associated with the first and second indices and to interpolate the second combined channel estimation to obtain channel estimation values associated with the first and second indices. An interpolator may carry out the interpolation. The indices may be associated with subcarrier indices. After interpolation, the first combined channel estimation yields a channel estimation value at each index in the set of first and second indices. After interpolation, the second combined channel estimation yields a channel estimation value at each index in the set of first and second indices. The interpolator may perform a 1:2 interpolation or a 1:6 interpolation, and the interpolation may be linear. As should be appreciated, other interpolation ratios and other types of interpolation (e.g., polynomial, spline, etc.) may be used. The interpolation may be linear interpolation.

In addition to or in combination with any of the features discussed above with respect to apparatus 400, the one or more processors 404 may be configured to align the first combined channel estimation and the second combined channel estimation before interpolation (e.g., determining a common timing offset and applying it to the first combined channel estimation and applying it to the second combined channel estimation). The alignment may be carried out by a timing adjustor and may be part of the interpolator. The common timing offset may be based on a first timing offset associated with a first antenna port and a second timing offset associated with the second antenna port (e.g., an average timing offset for all antenna ports). The timing offset associated with each antenna port may be determined by determining the average phase difference between adjacent symbol values for a given antenna port and then converting the phase slope from the frequency domain to a time shift in the time domain. The timing offset associated with each antenna port may also be determined by converting the channel response for a given antenna port to the time domain (e.g., using a discrete Fourier transform) and determining the timing offset needed to shift the impulse response around a reference time (e.g., to center around a reference of time zero). The alignment and timing adjustment may be carried out on the first and second combined channel estimations (e.g., as a timing pre-correction on the combined channels before frequency de-spread) based on the timing offsets associated with each antenna port (e.g., a common timing offset based on the average of the timing offsets associated with each respective antenna port). If a timing pre-correction is performed on the combined channels before frequency de-spread using a common timing offset, the timing offsets associated with each antenna port determined after frequency de-spread may be a residual offset with respect to the common timing offset.

In addition to or in combination with any of the features discussed above with respect to apparatus 400, the common timing offset may be updated for each slot in which a reference symbol is repeated by adding to it the respective timing offset associated with each antenna port (e.g, after de spread channel) for the current slot. This may form the new common timing offset for the next slot.

In addition to or in combination with any of the features discussed above with respect to apparatus 400, the various functions described above with respect to processor 404 may also apply to dual DM-RS (e.g., a pair of adjacent DM-RS symbols (e.g., in a same slot) used to support, instead of the two TX antenna ports described above, more than four TX antenna ports in the case of DM-RS Type 1 and more than six TX antenna ports in the case of DM-RS Type 2). In the case of dual DM-RS, a time de-spread may be used after frequency de-spread to obtain the additional antenna ports.

In addition to or in combination with any of the features discussed above with respect to apparatus 400, the one or more processors 404 may be configured may be further configured to perform a noise filtering operation after frequency de-spread (or after time-de-spread in the case of dual DM-RS). The noise filtering operation removes the noise from the channel estimations to provide noise-filtered channel estimations.

In addition to or in combination with any of the features discussed above with respect to apparatus 400, the one or more processors 404 may be configured may be further configured to remove the timing offset from the noise-filtered channel estimations. Removing the timing offset from the noise-filtered channel estimations align the timing references for the noise-filtered channel estimates to the timing of the original DM-RS pilots.

In addition to or in combination with any of the features discussed above with respect to apparatus 400, the one or more processors 404 may be further configured to estimate a noise power associated with each antenna port from the re-aligned noise-filtered channel estimates.

Example 1 is a channel estimation apparatus that includes a receiver configured to receive a reference symbol, the reference symbol including one or more first symbol values associated with a first antenna port and one or more second symbol values associated with a second antenna port. The channel estimation apparatus also includes a processor configured to determine based on the reference symbol a first channel estimation associated with the first antenna port. The processor is configured to determine based on the reference symbol a second channel estimation associated with the second antenna port. The processor is configured to determine a first combined channel estimation based on a first combination of the first channel estimation and the second channel estimation, wherein the first combined channel estimation includes first combined channel estimation values associated with first indices. The processor is configured to determine a second combined channel estimation based on a second combination of the first channel estimation and the second channel estimation, wherein the second combined channel estimation includes second combined channel estimation values associated with second indices. The processor is configured to interpolate the first combined channel estimation to obtain interpolated first combined channel estimation values associated with the second indices. The processor is configured to interpolate the second combined channel estimation to obtain interpolated second combined channel estimation values associated with the first indices.

Example 2 is the channel estimation apparatus of Example 1, wherein the reference symbol includes one or more received subcarriers representing the reference symbol.

Example 3 is the channel estimation apparatus of either Example 1 or 2, wherein the one or more received subcarriers include one or more first subcarrier values associated with the first antenna port and one or more second subcarrier values associated with the second antenna port.

Example 4 is the channel estimation apparatus of Example 3, wherein the first indices and second indices correspond to subcarrier indices, wherein each subcarrier index of first indices is different from each subcarrier index of the second indices.

Example 5 is the channel estimation apparatus of any one of Examples 1 to 4, wherein after interpolation, the first combined channel estimation includes first combined channel estimation values at each of the first indices and interpolated first channel estimation values at each of the second indices and the second combined channel estimation includes second combined channel estimation values at each of the second indices and interpolated second channel estimation values at each of the first indices.

Example 6 is the channel estimation apparatus of any one of Examples 1 to 5, wherein the first combination of the first channel estimation and the second channel estimation is a sum of the first channel estimation and the second channel estimation, and wherein the second combination of the first channel estimation and the second channel estimation is a difference between the first channel estimation and the second channel estimation.

Example 7 is the channel estimation apparatus of any one of Examples 1 to 6, wherein the reference symbol includes a modulated reference symbol, wherein the reference symbol has been modulated by a known base sequence, wherein the first channel estimation and second channel estimation includes the modulated reference symbol demodulated by the known base sequence.

Example 8 is the channel estimation apparatus of any one of Examples 1 to 7, wherein the reference symbols are demodulation reference symbols, and wherein the demodulation reference symbols are configured for operation in a fifth generation (5G) network.

Example 9 is the channel estimation apparatus of any one of Examples 1 to 8, wherein the interpolated first combined channel estimation values are obtained from the first combined channel estimation using 1:2 interpolation or 1:6 interpolation; and wherein the interpolated second combined channel estimation values are obtained from the second combined channel estimation using 1:2 interpolation or 1:6 interpolation.

Example 10 is the channel estimation apparatus of Example 9, wherein the interpolation is linear interpolation.

Example 11 is the channel estimation apparatus of any one of Examples 1 to 10, wherein the processor is further configured to align the first combined channel estimation and the second combined channel estimation by applying a common timing offset.

Example 12 is the channel estimation apparatus of Example 11, wherein the common timing offset is based on a first estimated timing offset associated with the first antenna port and a second estimated timing offset associated with the second antenna port, wherein applying a common timing offset includes applying the common timing offset to the first combined channel estimation to obtain a first time-adjusted combined channel estimation and applying the common timing offset to the second combined channel estimation to obtain a second time-adjusted combined channel estimation.

Example 13 is the channel estimation apparatus of Examples 11 or 12, wherein the common timing offset includes an average of the first estimated timing offset associated with the first antenna port and the second estimated timing offset associated with the second antenna port.

Example 14 is the channel estimation apparatus of any one of Examples 11 to 13, wherein the common timing offset includes an average common timing offset for the reference symbol over a plurality of time slots, wherein the average common timing offset for a first slot of the plurality of time slots is set to zero.

Example 15 is the channel estimation apparatus of Example 14, wherein the average common timing offset for the first slot is set to a second slot average common timing offset for a second slot of the plurality of time slots.

Example 16 is the channel estimation apparatus of any one of Examples 12 to 15, wherein the first estimated timing offset is determined from phase differences between adjacent symbol values of the one or more first symbol values associated with the first antenna port and the second estimated timing offset is determined from the phase differences between adjacent symbol values of the one or more second symbol values associated with the second antenna port.

Example 17 is the channel estimation apparatus of any one of Examples 12 to 16, wherein the first estimated timing offset is determined by converting the first channel estimation to the time domain as a first converted channel estimation and centering the first converted channel estimation around a reference time, and wherein the second estimated timing offset is determined by converting the second channel estimation to the time domain as a second converted channel estimation and centering the second converted channel estimation around the reference time.

Example 18 is the channel estimation apparatus of any one of Examples 12 to 17, wherein the processor is further configured to determine a time-adjusted first channel estimation based on the common timing offset and the first combined channel estimation, the processor is further configured to determine a time-adjusted second channel estimation based on the common timing offset and the second combined channel estimation.

Example 19 is the channel estimation apparatus of any one of Examples 1 to 18, wherein the processor is further configured to interpolate the first combined channel estimation by interpolating the time-adjusted first channel estimation, and wherein the processor is further configured to interpolate the second combined channel estimation by interpolating the time-adjusted second channel estimation.

Example 20 is the channel estimation apparatus of any one of Examples 1 to 19, wherein the processor is further configured to determine the channel estimation for the first antenna port by adding the first combined channel estimation to the second combined channel estimation and dividing by two, and wherein the processor is further configured to determine the channel estimation for the second antenna port by subtracting the second combined channel estimation from the first combined channel estimation and then dividing by two.

Example 21 is the channel estimation apparatus of any one of Examples 1 to 20, wherein the processor is further configured to de-spread the first combined channel estimation with one or more orthogonal code sequences to determine a first de-spread channel estimation associated with the first antenna port and to de-spread the second combined channel estimation with one or more orthogonal code sequences to determine a second de-spread channel estimation associated with the second antenna port, wherein the one or more orthogonal code sequences include one or more orthogonal cover code sequences, and wherein the one or more orthogonal code sequences include one or more orthogonal code sequences in the frequency domain.

Example 22 is the channel estimation apparatus of any one of Examples 1 to 21, wherein the reference symbol includes a dual demodulation reference symbol, wherein the dual demodulation reference symbol includes adjacent symbols in a same slot.

Example 23 is the channel estimation apparatus of any one of Examples 21 to 22, wherein the processor is further configured to de-spread the first de-spread channel estimation with one or more orthogonal code sequences in the time domain and/or to de-spread the second de-spread channel estimation with one or more orthogonal code sequences in the time domain.

Example 24 is the channel estimation apparatus of any one of Examples 21 to 23, wherein the processor is further configured to determine a first timing offset for the first de-spread channel estimation and a second timing offset for the second de-spread channel estimation.

Example 25 is the channel estimation apparatus of Example 24, wherein the determined first timing offset associated with the first de-spread channel estimation is a first residual timing offset with respect to a timing offset common to the first channel estimation and to the second channel estimation and/or wherein the determined second timing offset associated with the second de-spread channel estimation is a second residual timing offset with respect to the timing offset common to the first channel estimation and to the second channel estimation.

Example 26 is the channel estimation apparatus of any one of Examples 24 to 25, wherein the processor is further configured to adapt a timing offset common to the first channel estimation and to the second channel estimation based on the determined first timing offset associated with the first de-spread channel estimation and on the determined second timing offset associated with the second de-spread channel estimation, wherein the processor is further configured to adapt the common timing offset by adding an average between the first timing offset associated with the first de-spread channel estimation and the second timing offset associated with the second de-spread channel estimation to the common timing offset.

Example 27 is the channel estimation apparatus of any one of Examples 24 to 26, wherein the processor is further configured to apply the determined first timing offset to the first de-spread channel estimation to provide a first time adjusted de-spread channel estimation and/or apply the determined second timing offset to the second de-spread channel estimation to provide a second time adjusted de-spread channel estimation.

Example 28 is the channel estimation apparatus of Example 27, wherein the processor is further configured to perform a frequency interpolation and a noise filtering operation on the first time adjusted de-spread channel estimation to provide a first filtered channel estimation and/or perform a frequency interpolation and a noise filtering operation on the second time adjusted de-spread channel estimation to provide a second filtered channel estimation.

Example 29 is the channel estimation apparatus of Example 28, wherein the processor is further configured to remove the first timing offset associated with the first de-spread channel estimation from the first filtered channel estimation to provide a first aligned channel estimation and/or remove the second timing offset associated with the second de-spread channel estimation from the second filtered channel estimation to provide a second aligned channel estimation.

Example 30 is the channel estimation apparatus of Example 29, wherein the processor is further configured to estimate a first noise power associated with the first antenna port by using the first aligned channel estimation, and/or estimate a second noise power associated with the second antenna port by using the second aligned channel estimation.

Example 31 is the channel estimation apparatus of any one of Examples 1 to 30, wherein the first channel estimation is associated with uplink channel or a downlink channel and wherein the second channel estimation is associated with an uplink channel or a downlink channel.

Example 32 is a channel estimation method, wherein the method includes receiving a reference symbol, the reference symbol including one or more first symbol values associated with a first antenna port and one or more second symbol values associated with a second antenna port. The channel estimation method also includes determining based on the reference symbol a first channel estimation associated with the first antenna port. The method also includes determining based on the reference symbol a second channel estimation associated with the second antenna port. The method also includes determining a first combined channel estimation based on a first combination of the first channel estimation and the second channel estimation, wherein the first combined channel estimation includes first combined channel estimation values associated with first indices. The method also includes determining a second combined channel estimation based on a second combination of the first channel estimation and the second channel estimation, wherein the second combined channel estimation includes second combined channel estimation values associated with second indices. The method also includes interpolating the first combined channel estimation to obtain interpolated first combined channel estimation values associated with the second indices. The method also includes interpolating the second combined channel estimation to obtain interpolated second combined channel estimation values associated with the first indices.

Example 33 is the channel estimation method of Example 32, wherein the reference symbol includes one or more received subcarriers representing the reference symbol.

Example 34 is the channel estimation method of either Example 32 or 33, wherein the one or more received subcarriers include one or more first subcarrier values associated with the first antenna port and one or more second subcarrier values associated with the second antenna port.

Example 35 is the channel estimation method of Example 34, wherein the first indices and second indices correspond to subcarrier indices, wherein each subcarrier index of first indices is different from each subcarrier index of the second indices.

Example 36 is the channel estimation method of any one of Examples 32 to 35, wherein after interpolation, the first combined channel estimation includes first combined channel estimation values at each of the first indices and interpolated first channel estimation values at each of the second indices and the second combined channel estimation includes second combined channel estimation values at each of the second indices and interpolated second channel estimation values at each of the first indices.

Example 37 is the channel estimation method of any one of Examples 32 to 36, wherein the first combination of the first channel estimation and the second channel estimation is a sum of the first channel estimation and the second channel estimation, and wherein the second combination of the first channel estimation and the second channel estimation is a difference between the first channel estimation and the second channel estimation.

Example 38 is the channel estimation method of any one of Examples 32 to 37, wherein the reference symbol includes a modulated reference symbol, wherein the reference symbol has been modulated by a known base sequence, wherein the first channel estimation and second channel estimation includes the modulated reference symbol demodulated by the known base sequence.

Example 39 is the channel estimation method of any one of Examples 32 to 38, wherein the reference symbols are demodulation reference symbols, and wherein the demodulation reference symbols are configured for operation in a fifth generation (5G) network.

Example 40 is the channel estimation method of any one of Examples 32 to 39, wherein the interpolated first combined channel estimation values are obtained from the first combined channel estimation using 1:2 interpolation or 1:6 interpolation; and wherein the interpolated second combined channel estimation values are obtained from the second combined channel estimation using 1:2 interpolation or 1:6 interpolation.

Example 41 is the channel estimation method of Example 40, wherein the interpolation is linear interpolation.

Example 42 is the channel estimation method of any one of Examples 32 to 41, wherein the method also includes aligning the first combined channel estimation and the second combined channel estimation by applying a common timing offset.

Example 43 is the channel estimation method of Example 42, wherein the common timing offset is based on a first estimated timing offset associated with the first antenna port and a second estimated timing offset associated with the second antenna port, wherein applying a common timing offset includes applying the common timing offset to the first combined channel estimation to obtain a first time-adjusted combined channel estimation and applying the common timing offset to the second combined channel estimation to obtain a second time-adjusted combined channel estimation.

Example 44 is the channel estimation method of Examples 42 or 43, wherein the common timing offset includes an average of the first estimated timing offset associated with the first antenna port and the second estimated timing offset associated with the second antenna port.

Example 45 is the channel estimation method of any one of Examples 42 to 44, wherein the common timing offset includes an average common timing offset for the reference symbol over a plurality of time slots, wherein the average common timing offset for a first slot of the plurality of time slots is set to zero.

Example 46 is the channel estimation method of Example 45, wherein the average common timing offset for the first slot is set to a second slot average common timing offset for a second slot of the plurality of time slots.

Example 47 is the channel estimation method of any one of Examples 43 to 46, wherein the first estimated timing offset is determined from phase differences between adjacent symbol values of the one or more first symbol values associated with the first antenna port and the second estimated timing offset is determined from the phase differences between adjacent symbol values of the one or more second symbol values associated with the second antenna port.

Example 48 is the channel estimation method of any one of Examples 43 to 47, wherein the first estimated timing offset is determined by converting the first channel estimation to the time domain as a first converted channel estimation and centering the first converted channel estimation around a reference time, and wherein the second estimated timing offset is determined by converting the second channel estimation to the time domain as a second converted channel estimation and centering the second converted channel estimation around the reference time.

Example 49 is the channel estimation method of any one of Examples 43 to 48, wherein the method also includes determining a time-adjusted first channel estimation based on the common timing offset and the first combined channel estimation, and wherein the method also includes determining a time-adjusted second channel estimation based on the common timing offset and the second combined channel estimation.

Example 50 is the channel estimation method of any one of Examples 32 to 49, wherein the method also includes interpolating the first combined channel estimation by interpolating the time-adjusted first channel estimation, and wherein the method also includes interpolating the second combined channel estimation by interpolating the time-adjusted second channel estimation.

Example 51 is the channel estimation method of any one of Examples 32 to 50, wherein the method also includes determining the channel estimation for the first antenna port by adding the first combined channel estimation to the second combined channel estimation and dividing by two, and wherein the method also includes determining the channel estimation for the second antenna port by subtracting the second combined channel estimation from the first combined channel estimation and then dividing by two.

Example 52 is the channel estimation method of any one of Examples 32 to 51, wherein the method also includes de-spreading the first combined channel estimation with one or more orthogonal code sequences to determine a first de-spread channel estimation associated with the first antenna port and to de-spread the second combined channel estimation with one or more orthogonal code sequences to determine a second de-spread channel estimation associated with the second antenna port, wherein the one or more orthogonal code sequences include one or more orthogonal cover code sequences, and wherein the one or more orthogonal code sequences include one or more orthogonal code sequences in the frequency domain.

Example 53 is the channel estimation method of any one of Examples 32 to 52, wherein the reference symbol includes a dual demodulation reference symbol, wherein the dual demodulation reference symbol includes adjacent symbols in a same slot.

Example 54 is the channel estimation method of any one of Examples 52 to 53, wherein the method also includes de-spreading the first de-spread channel estimation with one or more orthogonal code sequences in the time domain and/or de-spreading the second de-spread channel estimation with one or more orthogonal code sequences in the time domain.

Example 55 is the channel estimation method of any one of Examples 52 to 54, wherein the method also includes determining a first timing offset for the first de-spread channel estimation and a second timing offset for the second de-spread channel estimation.

Example 56 is the channel estimation method of Example 55, wherein the determined first timing offset associated with the first de-spread channel estimation is a first residual timing offset with respect to a timing offset common to the first channel estimation and to the second channel estimation and/or wherein the determined second timing offset associated with the second de-spread channel estimation is a second residual timing offset with respect to the timing offset common to the first channel estimation and to the second channel estimation.

Example 57 is the channel estimation method of any one of Examples 55 to 56, wherein the method further includes adapting a timing offset common to the first channel estimation and to the second channel estimation based on the determined first timing offset associated with the first de-spread channel estimation and on the determined second timing offset associated with the second de-spread channel estimation, wherein method also includes adapting the common timing offset by adding an average between the first timing offset associated with the first de-spread channel estimation and the second timing offset associated with the second de-spread channel estimation to the common timing offset.

Example 58 is the channel estimation method of any one of Examples 55 to 57, wherein the method also includes applying the determined first timing offset to the first de-spread channel estimation to provide a first time adjusted de-spread channel estimation and/or applying the determined second timing offset to the second de-spread channel estimation to provide a second time adjusted de-spread channel estimation.

Example 59 is the channel estimation method of Example 58, wherein the method also includes performing a frequency interpolation and a noise filtering operation on the first time adjusted de-spread channel estimation to provide a first filtered channel estimation and/or performing a frequency interpolation and a noise filtering operation on the second time adjusted de-spread channel estimation to provide a second filtered channel estimation.

Example 60 is the channel estimation method of Example 59, wherein the method also includes removing the first timing offset associated with the first de-spread channel estimation from the first filtered channel estimation to provide a first aligned channel estimation and/or removing the second timing offset associated with the second de-spread channel estimation from the second filtered channel estimation to provide a second aligned channel estimation.

Example 61 is the channel estimation method of Example 60, wherein the method also includes estimating a first noise power associated with the first antenna port by using the first aligned channel estimation, and/or estimating a second noise power associated with the second antenna port by using the second aligned channel estimation.

Example 62 is the channel estimation method of any one of Examples 32 to 61, wherein the first channel estimation is associated with uplink channel or a downlink channel and wherein the second channel estimation is associated with an uplink channel or a downlink channel.

Example 63 is one or more non-transient computer readable media, configured to cause one or more processors, when executed, to perform a method for channel estimation. The method stored in the non-transient computer readable media includes receiving a reference symbol, the reference symbol including one or more first symbol values associated with a first antenna port and one or more second symbol values associated with a second antenna port. The channel estimation method also includes determining based on the reference symbol a first channel estimation associated with the first antenna port. The method also includes determining based on the reference symbol a second channel estimation associated with the second antenna port. The method also includes determining a first combined channel estimation based on a first combination of the first channel estimation and the second channel estimation, wherein the first combined channel estimation includes first combined channel estimation values associated with first indices. The method also includes determining a second combined channel estimation based on a second combination of the first channel estimation and the second channel estimation, wherein the second combined channel estimation includes second combined channel estimation values associated with second indices. The method also includes interpolating the first combined channel estimation to obtain interpolated first combined channel estimation values associated with the second indices. The method also includes interpolating the second combined channel estimation to obtain interpolated second combined channel estimation values associated with the first indices.

Example 64 is the non-transient computer readable media of Example 63, wherein the reference symbol includes one or more received subcarriers representing the reference symbol.

Example 65 is the non-transient computer readable media of either Example 63 or 64, wherein the one or more received subcarriers include one or more first subcarrier values associated with the first antenna port and one or more second subcarrier values associated with the second antenna port.

Example 66 is the non-transient computer readable media of Example 65, wherein the first indices and second indices correspond to subcarrier indices, wherein each subcarrier index of first indices is different from each subcarrier index of the second indices.

Example 67 is the non-transient computer readable media of any one of Examples 63 to 66, wherein after interpolation, the first combined channel estimation includes first combined channel estimation values at each of the first indices and interpolated first channel estimation values at each of the second indices and the second combined channel estimation includes second combined channel estimation values at each of the second indices and interpolated second channel estimation values at each of the first indices.

Example 68 is the non-transient computer readable media of any one of Examples 63 to 67, wherein the first combination of the first channel estimation and the second channel estimation is a sum of the first channel estimation and the second channel estimation, and wherein the second combination of the first channel estimation and the second channel estimation is a difference between the first channel estimation and the second channel estimation.

Example 69 is the non-transient computer readable media of any one of Examples 63 to 68, wherein the reference symbol includes a modulated reference symbol, wherein the reference symbol has been modulated by a known base sequence, wherein the first channel estimation and second channel estimation includes the modulated reference symbol demodulated by the known base sequence.

Example 70 is the non-transient computer readable media of any one of Examples 63 to 69, wherein the reference symbols are demodulation reference symbols, and wherein the demodulation reference symbols are configured for operation in a fifth generation (5G) network.

Example 71 is the non-transient computer readable media of any one of Examples 63 to 70, wherein the interpolated first combined channel estimation values are obtained from the first combined channel estimation using 1:2 interpolation or 1:6 interpolation; and wherein the interpolated second combined channel estimation values are obtained from the second combined channel estimation using 1:2 interpolation or 1:6 interpolation.

Example 72 is the non-transient computer readable media of Example 71, wherein the interpolation is linear interpolation.

Example 73 is the non-transient computer readable media of any one of Examples 63 to 72, wherein the method also includes aligning the first combined channel estimation and the second combined channel estimation by applying a common timing offset.

Example 74 is the non-transient computer readable media of Example 73, wherein the common timing offset is based on a first estimated timing offset associated with the first antenna port and a second estimated timing offset associated with the second antenna port, wherein applying a common timing offset includes applying the common timing offset to the first combined channel estimation to obtain a first time-adjusted combined channel estimation and applying the common timing offset to the second combined channel estimation to obtain a second time-adjusted combined channel estimation.

Example 75 is the non-transient computer readable media of Examples 73 or 74, wherein the common timing offset includes an average of the first estimated timing offset associated with the first antenna port and the second estimated timing offset associated with the second antenna port.

Example 76 is the non-transient computer readable media of any one of Examples 73 to 75, wherein the common timing offset includes an average common timing offset for the reference symbol over a plurality of time slots, wherein the average common timing offset for a first slot of the plurality of time slots is set to zero.

Example 77 is the non-transient computer readable media of Example 76, wherein the average common timing offset for the first slot is set to a second slot average common timing offset for a second slot of the plurality of time slots.

Example 78 is the non-transient computer readable media of any one of Examples 74 to 77, wherein the first estimated timing offset is determined from phase differences between adjacent symbol values of the one or more first symbol values associated with the first antenna port and the second estimated timing offset is determined from the phase differences between adjacent symbol values of the one or more second symbol values associated with the second antenna port.

Example 79 is the non-transient computer readable media of any one of Examples 74 to 78, wherein the first estimated timing offset is determined by converting the first channel estimation to the time domain as a first converted channel estimation and centering the first converted channel estimation around a reference time, and wherein the second estimated timing offset is determined by converting the second channel estimation to the time domain as a second converted channel estimation and centering the second converted channel estimation around the reference time.

Example 80 is the non-transient computer readable media of any one of Examples 74 to 79, wherein the method also includes determining a time-adjusted first channel estimation based on the common timing offset and the first combined channel estimation, and wherein the method also includes determining a time-adjusted second channel estimation based on the common timing offset and the second combined channel estimation.

Example 81 is the non-transient computer readable media of any one of Examples 63 to 80, wherein method also includes interpolating the first combined channel estimation by interpolating the time-adjusted first channel estimation, and wherein the method also includes interpolating the second combined channel estimation by interpolating the time-adjusted second channel estimation.

Example 82 is the non-transient computer readable media of any one of Examples 63 to 81, wherein the method also includes determining the channel estimation for the first antenna port by adding the first combined channel estimation to the second combined channel estimation and dividing by two, and wherein the method also includes determining the channel estimation for the second antenna port by subtracting the second combined channel estimation from the first combined channel estimation and then dividing by two.

Example 83 is the non-transient computer readable media of any one of Examples 63 to 82, wherein the method also includes de-spreading the first combined channel estimation with one or more orthogonal code sequences to determine a first de-spread channel estimation associated with the first antenna port and to de-spread the second combined channel estimation with one or more orthogonal code sequences to determine a second de-spread channel estimation associated with the second antenna port, wherein the one or more orthogonal code sequences include one or more orthogonal cover code sequences, and wherein the one or more orthogonal code sequences include one or more orthogonal code sequences in the frequency domain.

Example 84 is the non-transient computer readable media of any one of Examples 63 to 83, wherein the reference symbol includes a dual demodulation reference symbol, wherein the dual demodulation reference symbol includes adjacent symbols in a same slot.

Example 85 is the non-transient computer readable media of any one of Examples 83 to 84, wherein the method also includes de-spreading the first de-spread channel estimation with one or more orthogonal code sequences in the time domain and/or de-spreading the second de-spread channel estimation with one or more orthogonal code sequences in the time domain.

Example 86 is the non-transient computer readable media of any one of Examples 83 to 85, wherein the method also includes determining a first timing offset for the first de-spread channel estimation and a second timing offset for the second de-spread channel estimation.

Example 87 is the non-transient computer readable media of Example 86, wherein the determined first timing offset associated with the first de-spread channel estimation is a first residual timing offset with respect to a timing offset common to the first channel estimation and to the second channel estimation and/or wherein the determined second timing offset associated with the second de-spread channel estimation is a second residual timing offset with respect to the timing offset common to the first channel estimation and to the second channel estimation.

Example 88 is the non-transient computer readable media of any one of Examples 86 to 87, wherein the method further includes adapting a timing offset common to the first channel estimation and to the second channel estimation based on the determined first timing offset associated with the first de-spread channel estimation and on the determined second timing offset associated with the second de-spread channel estimation, wherein method also includes adapting the common timing offset by adding an average between the first timing offset associated with the first de-spread channel estimation and the second timing offset associated with the second de-spread channel estimation to the common timing offset.

Example 89 is the non-transient computer readable media of any one of Examples 86 to 88, wherein the method also includes applying the determined first timing offset to the first de-spread channel estimation to provide a first time adjusted de-spread channel estimation and/or applying the determined second timing offset to the second de-spread channel estimation to provide a second time adjusted de-spread channel estimation.

Example 90 is the non-transient computer readable media of Example 89, wherein the method also includes performing a frequency interpolation and a noise filtering operation on the first time adjusted de-spread channel estimation to provide a first filtered channel estimation and/or performing a frequency interpolation and a noise filtering operation on the second time adjusted de-spread channel estimation to provide a second filtered channel estimation.

Example 91 is the non-transient computer readable media of Example 90, wherein the method also includes removing the first timing offset associated with the first de-spread channel estimation from the first filtered channel estimation to provide a first aligned channel estimation and/or removing the second timing offset associated with the second de-spread channel estimation from the second filtered channel estimation to provide a second aligned channel estimation.

Example 92 is the non-transient computer readable media of Example 91, wherein the method also includes estimating a first noise power associated with the first antenna port by using the first aligned channel estimation, and/or estimating a second noise power associated with the second antenna port by using the second aligned channel estimation.

Example 93 is the non-transient computer readable media of any one of Examples 63 to 92, wherein the first channel estimation is associated with uplink channel or a downlink channel and wherein the second channel estimation is associated with an uplink channel or a downlink channel.

Example 94 is a channel estimation system that includes a means for receiving a reference symbol, the reference symbol including one or more first symbol values associated with a first antenna port and one or more second symbol values associated with a second antenna port. The channel estimation system also includes a means for determining based on the reference symbol a first channel estimation associated with the first antenna port. The channel estimation system also includes a means for determining based on the reference symbol a second channel estimation associated with the second antenna port. The channel estimation system also includes a means for determining a first combined channel estimation based on a first combination of the first channel estimation and the second channel estimation, wherein the first combined channel estimation includes first combined channel estimation values associated with first indices. The channel estimation system also includes a means for determining a second combined channel estimation based on a second combination of the first channel estimation and the second channel estimation, wherein the second combined channel estimation includes second combined channel estimation values associated with second indices. The channel estimation system also includes a means for interpolating the first combined channel estimation to obtain interpolated first combined channel estimation values associated with the second indices. The channel estimation system also includes a means for interpolating the second combined channel estimation to obtain interpolated second combined channel estimation values associated with the first indices.

Example 95 is the channel estimation system of Example 94, wherein the reference symbol includes one or more received subcarriers representing the reference symbol.

Example 96 is the channel estimation system of either Example 94 or 95, wherein the one or more received subcarriers include one or more first subcarrier values associated with the first antenna port and one or more second subcarrier values associated with the second antenna port.

Example 97 is the channel estimation system of Example 96, wherein the first indices and second indices correspond to subcarrier indices, wherein each subcarrier index of first indices is different from each subcarrier index of the second indices.

Example 98 is the channel estimation system of any one of Examples 94 to 97, wherein after interpolation, the first combined channel estimation includes first combined channel estimation values at each of the first indices and interpolated first channel estimation values at each of the second indices and the second combined channel estimation includes second combined channel estimation values at each of the second indices and interpolated second channel estimation values at each of the first indices.

Example 99 is the channel estimation system of any one of Examples 94 to 98, wherein the first combination of the first channel estimation and the second channel estimation is a sum of the first channel estimation and the second channel estimation, and wherein the second combination of the first channel estimation and the second channel estimation is a difference between the first channel estimation and the second channel estimation.

Example 100 is the channel estimation system of any one of Examples 94 to 99, wherein the reference symbol includes a modulated reference symbol, wherein the reference symbol has been modulated by a known base sequence, wherein the first channel estimation and second channel estimation includes the modulated reference symbol demodulated by the known base sequence.

Example 101 is the channel estimation system of any one of Examples 94 to 100, wherein the reference symbols are demodulation reference symbols, and wherein the demodulation reference symbols are configured for operation in a fifth generation (5G) network.

Example 102 is the channel estimation system of any one of Examples 94 to 101, wherein the interpolated first combined channel estimation values are obtained from the first combined channel estimation using 1:2 interpolation or 1:6 interpolation; and wherein the interpolated second combined channel estimation values are obtained from the second combined channel estimation using 1:2 interpolation or 1:6 interpolation.

Example 103 is the channel estimation system of Example 102, wherein the interpolation is linear interpolation.

Example 104 is the channel estimation system of any one of Examples 94 to 103, wherein the channel estimation system also includes a means for aligning the first combined channel estimation and the second combined channel estimation by applying a common timing offset.

Example 105 is the channel estimation system of Example 104, wherein the common timing offset is based on a first estimated timing offset associated with the first antenna port and a second estimated timing offset associated with the second antenna port, wherein applying a common timing offset includes applying the common timing offset to the first combined channel estimation to obtain a first time-adjusted combined channel estimation and applying the common timing offset to the second combined channel estimation to obtain a second time-adjusted combined channel estimation.

Example 106 is the channel estimation system of Examples 104 or 105, wherein the common timing offset includes an average of the first estimated timing offset associated with the first antenna port and the second estimated timing offset associated with the second antenna port.

Example 107 is the channel estimation system of any one of Examples 104 to 106, wherein the common timing offset includes an average common timing offset for the reference symbol over a plurality of time slots, wherein the average common timing offset for a first slot of the plurality of time slots is set to zero.

Example 108 is the channel estimation system of Example 107, wherein the average common timing offset for the first slot is set to a second slot average common timing offset for a second slot of the plurality of time slots.

Example 109 is the channel estimation system of any one of Examples 105 to 108, wherein the first estimated timing offset is determined from phase differences between adjacent symbol values of the one or more first symbol values associated with the first antenna port and the second estimated timing offset is determined from the phase differences between adjacent symbol values of the one or more second symbol values associated with the second antenna port.

Example 110 is the channel estimation system of any one of Examples 105 to 109, wherein the first estimated timing offset is determined by converting the first channel estimation to the time domain as a first converted channel estimation and centering the first converted channel estimation around a reference time, and wherein the second estimated timing offset is determined by converting the second channel estimation to the time domain as a second converted channel estimation and centering the second converted channel estimation around the reference time.

Example 111 is the channel estimation system of any one of Examples 105 to 110, wherein the channel estimation system also includes a means for determining a time-adjusted first channel estimation based on the common timing offset and the first combined channel estimation, and the channel estimation system also includes a means for determining a time-adjusted second channel estimation based on the common timing offset and the second combined channel estimation.

Example 112 is the channel estimation system of any one of Examples 94 to 111, wherein the channel estimation system also includes a means for interpolating the first combined channel estimation by interpolating the time-adjusted first channel estimation, and wherein the channel estimation system also includes a means for interpolating the second combined channel estimation by interpolating the time-adjusted second channel estimation.

Example 113 is the channel estimation system of any one of Examples 94 to 112, wherein the channel estimation system also includes a means for determining the channel estimation for the first antenna port by adding the first combined channel estimation to the second combined channel estimation and dividing by two, and wherein the channel estimation system also includes a means for determining the channel estimation for the second antenna port by subtracting the second combined channel estimation from the first combined channel estimation and then dividing by two.

Example 114 is the channel estimation system of any one of Examples 94 to 113, wherein the channel estimation system also includes a means for de-spreading the first combined channel estimation with one or more orthogonal code sequences to determine a first de-spread channel estimation associated with the first antenna port and a means for de-spreading the second combined channel estimation with one or more orthogonal code sequences to determine a second de-spread channel estimation associated with the second antenna port, wherein the one or more orthogonal code sequences include one or more orthogonal cover code sequences, and wherein the one or more orthogonal code sequences include one or more orthogonal code sequences in the frequency domain.

Example 115 is the channel estimation system of any one of Examples 94 to 114, wherein the reference symbol includes a dual demodulation reference symbol, wherein the dual demodulation reference symbol includes adjacent symbols in a same slot.

Example 116 is the channel estimation system of any one of Examples 114 to 115, wherein the channel estimation system also includes a means for de-spreading the first de-spread channel estimation with one or more orthogonal code sequences in the time domain and/or a means for de-spreading the second de-spread channel estimation with one or more orthogonal code sequences in the time domain.

Example 117 is the channel estimation system of any one of Examples 114 to 116, wherein the channel estimation system also includes a means for determining a first timing offset for the first de-spread channel estimation and a second timing offset for the second de-spread channel estimation.

Example 118 is the channel estimation system of Example 117, wherein the determined first timing offset associated with the first de-spread channel estimation is a first residual timing offset with respect to a timing offset common to the first channel estimation and to the second channel estimation and/or wherein the determined second timing offset associated with the second de-spread channel estimation is a second residual timing offset with respect to the timing offset common to the first channel estimation and to the second channel estimation.

Example 119 is the channel estimation system of any one of Examples 117 to 118, wherein the channel estimation system also includes a means for adapting a timing offset common to the first channel estimation and to the second channel estimation based on the determined first timing offset associated with the first de-spread channel estimation and on the determined second timing offset associated with the second de-spread channel estimation, and wherein the channel estimation system also includes a means adapting the common timing offset by adding an average between the first timing offset associated with the first de-spread channel estimation and the second timing offset associated with the second de-spread channel estimation to the common timing offset.

Example 120 is the channel estimation system of any one of Examples 117 to 119, wherein the channel estimation system also includes a means for applying the determined first timing offset to the first de-spread channel estimation to provide a first time adjusted de-spread channel estimation and/or a means for applying the determined second timing offset to the second de-spread channel estimation to provide a second time adjusted de-spread channel estimation.

Example 121 is the channel estimation system of Example 120, wherein the channel estimation system also includes a means for performing a frequency interpolation and a noise filtering operation on the first time adjusted de-spread channel estimation a means for providing a first filtered channel estimation and/or perform a frequency interpolation and a noise filtering operation on the second time adjusted de-spread channel estimation to provide a second filtered channel estimation.

Example 122 is the channel estimation system of Example 121, wherein the channel estimation system also includes a means for removing the first timing offset associated with the first de-spread channel estimation from the first filtered channel estimation to provide a first aligned channel estimation and/or a means for removing the second timing offset associated with the second de-spread channel estimation from the second filtered channel estimation to provide a second aligned channel estimation.

Example 123 is the channel estimation system of Example 122, wherein the channel estimation system also includes a means for estimating a first noise power associated with the first antenna port by using the first aligned channel estimation, and/or a means for estimating a second noise power associated with the second antenna port by using the second aligned channel estimation.

Example 124 is the channel estimation system of any one of Examples 94 to 123, wherein the first channel estimation is associated with uplink channel or a downlink channel and wherein the second channel estimation is associated with an uplink channel or a downlink channel.

While the disclosure has been particularly shown and described with reference to exemplary apparatuses and methods, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:
1. An apparatus comprising:
a receiver configured to receive a reference symbol, the reference symbol comprising one or more first symbol values associated with a first antenna port and one or more second symbol values associated with a second antenna port; and
a processor configured to:
determine based on the reference symbol a first channel estimation associated with the first antenna port;
determine based on the reference symbol a second channel estimation associated with the second antenna port;
determine a first combined channel estimation based on a first combination of the first channel estimation and the second channel estimation, wherein the first combined channel estimation comprises first estimation values associated with first indices;
determine a second combined channel estimation based on a second combination of the first channel estimation and the second channel estimation, wherein the second combined channel estimation comprises second estimation values associated with second indices; and interpolate the first combined channel estimation to obtain interpolated first estimation values associated with the second indices, and interpolate the second combined channel estimation to obtain interpolated second estimation values associated with the first indices.

2. The apparatus of claim 1, wherein the reference symbol comprises one or more received subcarriers representing the reference symbol.

3. The apparatus of claim 2, wherein the one or more received subcarriers comprise one or more first subcarrier values associated with the first antenna port and one or more second subcarrier values associated with the second antenna port.

4. The apparatus of claim 3, wherein the first indices and the second indices correspond to subcarrier indices, wherein each subcarrier index of the first indices is different from each subcarrier index of the second indices.

5. The apparatus of claim 1, wherein after interpolation, the first combined channel estimation comprises the first estimation values at each of the first indices and the interpolated first estimation values at each of the second indices and the second combined channel estimation comprises the second estimation values at each of the second indices and the interpolated second estimation values at each of the first indices.

6. The apparatus of claim 1, wherein the first combination of the first channel estimation and the second channel estimation comprises a sum of the first channel estimation and the second channel estimation, and wherein the second combination of the first channel estimation and the second channel estimation comprises a difference between the first channel estimation and the second channel estimation.

7. The apparatus of claim 1, wherein the reference symbol comprises a modulated reference symbol, wherein the reference symbol has been modulated by a known base sequence, wherein the first channel estimation and second channel estimation comprise the modulated reference symbol demodulated by the known base sequence.

8. The apparatus of claim 1, wherein the reference symbol comprises demodulation reference symbols, and wherein the demodulation reference symbols are configured for operation in a fifth generation (5G) network.

9. The apparatus of claim 1, wherein the interpolated first estimation values are obtained from the first combined channel estimation using 1:2 linear interpolation or 1:6 linear interpolation, and wherein the interpolated second estimation values are obtained from the second combined channel estimation using 1:2 linear interpolation or 1:6 linear interpolation.

10. The apparatus of claim 1, wherein the processor is further configured to align the first combined channel estimation and the second combined channel estimation by applying a common timing offset to the first combined channel estimation and the second combined channel estimation.

11. The apparatus of claim 10, wherein the common timing offset is based on a first estimated timing offset associated with the first antenna port and a second estimated timing offset associated with the second antenna port, wherein applying the common timing offset comprises:

applying the common timing offset to the first combined channel estimation to obtain a first time-adjusted combined channel estimation; and applying the common timing offset to the second combined channel estimation to obtain a second time-adjusted combined channel estimation.

12. The apparatus of claim 10, wherein the common timing offset comprises an average of a first estimated timing offset associated with the first antenna port and a second estimated timing offset associated with the second antenna port.

13. The apparatus of claim 10, wherein the common timing offset comprises an average common timing offset for the reference symbol over a plurality of time slots, wherein the average common timing offset for a first slot of the plurality of time slots is set to zero.

14. The apparatus of claim 13, wherein the average common timing offset for the first slot is set to a second slot average common timing offset for a second slot of the plurality of time slots.

15. The apparatus of claim 11, wherein the first estimated timing offset is determined from phase differences between adjacent symbol values of the one or more first symbol values associated with the first antenna port and the second estimated timing offset is determined from the phase differences between adjacent symbol values of the one or more second symbol values associated with the second antenna port.

16. The apparatus of claim 11, wherein the first estimated timing offset is determined by converting the first channel estimation to a time domain as a first converted channel estimation and centering the first converted channel estimation around a reference time, and wherein the second estimated timing offset is determined by converting the second channel estimation to the time domain as a second converted channel estimation and centering the second converted channel estimation around the reference time.

17. The apparatus of claim 11, wherein the processor is further configured to interpolate the first combined channel estimation by interpolating the time-adjusted first channel estimation, and wherein the processor is further configured to interpolate the second combined channel estimation by interpolating the time-adjusted second channel estimation.

18. The apparatus of claim 1, wherein the processor is further configured to determine the first channel estimation for the first antenna port by adding the first combined channel estimation to the second combined channel estimation and dividing by two, wherein the processor is further configured to determine the second channel estimation for the second antenna port by subtracting the second combined channel estimation from the first combined channel estimation and then dividing by two.

19. The apparatus of claim 1, wherein the processor is further configured to de-spread the first combined channel estimation with one or more orthogonal code sequences to determine a first de-spread channel estimation associated with the first antenna port and to de-spread the second combined channel estimation with one or more orthogonal code sequences to determine a second de-spread channel estimation associated with the second antenna port, wherein the one or more orthogonal code sequences comprise one or more orthogonal cover code sequences, and wherein the one or more orthogonal code sequences comprise one or more orthogonal code sequences in a frequency domain.

20. The apparatus of claim 1, wherein the reference symbol comprises a dual demodulation reference symbol, wherein the dual demodulation reference symbol comprises adjacent symbols in a same slot.

* * * * *

UNITED STATES PATENT AND TRADEMARK OFFICE
CERTIFICATE OF CORRECTION

PATENT NO. : 11,973,618 B2
APPLICATION NO. : 17/353838
DATED : April 30, 2024
INVENTOR(S) : Thushara Hewavithana et al.

Page 1 of 1

It is certified that error appears in the above-identified patent and that said Letters Patent is hereby corrected as shown below:

On the Title Page

In (72) Inventors:
Change "Thushara Hewavithana, Tempe (GB)" to --Thushara Hewavithana, Tempe, AZ (US)--

Signed and Sealed this
Eleventh Day of June, 2024

Katherine Kelly Vidal
*Director of the United States Patent and Trademark Office*